United States Patent
Kenney et al.

(10) Patent No.: US 10,158,151 B2
(45) Date of Patent: Dec. 18, 2018

(54) HEAT EXCHANGERS FOR BATTERY THERMAL MANAGEMENT APPLICATIONS WITH INTEGRATED BYPASS

(71) Applicant: Dana Canada Corporation, Oakville (CA)

(72) Inventors: Benjamin A. Kenney, Toronto (CA); Joseph A. Kamenski, Hamilton (CA)

(73) Assignee: Dana Canada Corporation, Oakville (CA)

( * ) Notice: Subject to any disclaimer, the term of this patent is extended or adjusted under 35 U.S.C. 154(b) by 0 days.

(21) Appl. No.: 15/587,802

(22) Filed: May 5, 2017

(65) Prior Publication Data

US 2017/0324132 A1   Nov. 9, 2017

Related U.S. Application Data

(60) Provisional application No. 62/332,826, filed on May 6, 2016.

(51) Int. Cl.
*H01M 10/6556* (2014.01)
*H01M 10/625* (2014.01)
*H01M 2/10* (2006.01)

(52) U.S. Cl.
CPC ..... *H01M 10/6556* (2015.04); *H01M 2/1094* (2013.01); *H01M 10/625* (2015.04); *H01M 2220/20* (2013.01)

(58) Field of Classification Search
CPC .................. H01M 10/6556; H01M 10/625
See application file for complete search history.

(56) References Cited

U.S. PATENT DOCUMENTS

| | | | |
|---|---|---|---|
| 2,373,157 | A | 4/1941 | Worth |
| 2,410,952 | A | 11/1946 | Lighton |
| 4,210,127 | A | 7/1980 | Kleine et al. |
| 4,478,277 | A | 10/1984 | Friedman et al. |
| 5,005,640 | A | 4/1991 | Lapinski et al. |
| 5,611,392 | A | 3/1997 | Malecek et al. |
| 5,645,127 | A | 7/1997 | Enderle et al. |
| 5,718,286 | A | 2/1998 | Damsohn et al. |

(Continued)

FOREIGN PATENT DOCUMENTS

DE    102012006122 A1    9/2013

OTHER PUBLICATIONS

English Machine Translation of DE 10 2012 006 122 A1, obtained via Espacenet Patent Search.

(Continued)

*Primary Examiner* — Olatunji A Godo
(74) *Attorney, Agent, or Firm* — Marshall & Melhorn, LLC

(57) ABSTRACT

A heat exchanger for battery thermal management applications is disclosed. The heat exchanger has at least one internal, two-pass flow passage, the at least one internal, two-pass flow passage having an inlet end and an outlet end and at least a first flow passage portion and at least a second flow passage portion interconnected by a generally U-shaped turn portion. An inlet manifold is in fluid communication with the inlet end of the internal flow passage for delivering an incoming fluid stream to the heat exchanger while an outlet manifold is in fluid communication with the outlet end of the internal flow passage for discharging an outgoing fluid stream from the heat exchanger. A bypass passage fluidly interconnects the incoming fluid stream and the outgoing fluid stream.

20 Claims, 14 Drawing Sheets

(56) References Cited

U.S. PATENT DOCUMENTS

| | | |
|---|---|---|
| 5,836,383 A | 11/1998 | Zwittig |
| 5,950,715 A | 9/1999 | Jonsson et al. |
| 6,182,749 B1 | 2/2001 | Brost et al. |
| 6,613,472 B1 | 9/2003 | Watanabe |
| 7,026,065 B2 | 4/2006 | Ballantine et al. |
| 7,069,981 B2 | 7/2006 | Valensa et al. |
| 7,147,071 B2 | 12/2006 | Gering et al. |
| 7,192,668 B2 | 3/2007 | Dehne |
| 7,231,962 B2 | 6/2007 | Han |
| 8,182,661 B2 | 5/2012 | Tanase et al. |
| 8,191,618 B2 | 6/2012 | Gering et al. |
| 8,288,048 B2 | 10/2012 | Thompson |
| 8,297,343 B2 | 10/2012 | Yang |
| 8,418,365 B2 | 4/2013 | German et al. |
| 8,596,339 B2 | 12/2013 | Palanchon |
| 8,622,116 B2 | 1/2014 | Yang |
| 8,857,503 B2 | 10/2014 | Magill et al. |
| 8,911,898 B2 | 12/2014 | Jin |
| 8,960,269 B2 | 2/2015 | Cheadle et al. |
| 8,991,719 B2 | 3/2015 | Sheppard |
| 8,997,840 B2 | 4/2015 | Yang |
| 9,234,604 B2 | 1/2016 | Kim |
| 9,322,319 B2 | 4/2016 | Kim |
| 9,464,853 B2 | 10/2016 | Sheppard et al. |
| 2005/0170241 A1 | 8/2005 | German et al. |
| 2007/0271910 A1 | 11/2007 | Chanfreau |
| 2008/0090123 A1 | 4/2008 | Peng et al. |
| 2009/0239112 A1 | 9/2009 | Vanderwees |
| 2009/0323286 A1 | 12/2009 | Han |
| 2010/0132930 A1 | 6/2010 | Izenson et al. |
| 2010/0175857 A1 | 7/2010 | Gerstler et al. |
| 2010/0261046 A1 | 10/2010 | German et al. |
| 2011/0262794 A1 | 10/2011 | Yoon |
| 2011/0277967 A1 | 11/2011 | Fried et al. |
| 2012/0082880 A1 | 4/2012 | Koetting et al. |
| 2012/0152516 A1 | 6/2012 | Pineo et al. |
| 2012/0181712 A1 | 7/2012 | Vanderwees et al. |
| 2012/0237805 A1 | 9/2012 | Abels et al. |
| 2013/0071720 A1 | 3/2013 | Zahn |
| 2013/0126140 A1 | 5/2013 | Park et al. |
| 2013/0171493 A1 | 7/2013 | Wayne et al. |
| 2013/0244077 A1 | 9/2013 | Palanchon et al. |
| 2013/0273829 A1 | 10/2013 | Obasih et al. |
| 2013/0280596 A1 | 10/2013 | Lee et al. |
| 2013/0312939 A1 | 11/2013 | Uchida et al. |
| 2013/0330577 A1 | 12/2013 | Kristofek et al. |
| 2014/0090813 A1 | 4/2014 | Schmid et al. |
| 2014/0138075 A1 | 5/2014 | Yang et al. |
| 2014/0147709 A1 | 5/2014 | Ketkar et al. |
| 2014/0262200 A1 | 9/2014 | Sheppard et al. |
| 2014/0272513 A1 | 9/2014 | Sun et al. |
| 2014/0272518 A1 | 9/2014 | Silk et al. |
| 2014/0299302 A1 | 10/2014 | Moreau et al. |
| 2015/0010801 A1 | 1/2015 | Arena et al. |
| 2015/0168078 A1 | 6/2015 | Yang |
| 2015/0180059 A1 | 6/2015 | Vanderwees et al. |
| 2015/0200429 A1 | 7/2015 | Lee et al. |
| 2016/0036104 A1 | 2/2016 | Kenney et al. |
| 2016/0049705 A1 | 2/2016 | Mahe et al. |
| 2016/0097598 A1 | 4/2016 | Hirsch et al. |
| 2016/0204486 A1 | 7/2016 | Kenney et al. |

OTHER PUBLICATIONS

International Search Report and Written Opinion for PCT/CA2017/050551, dated Aug. 18, 2017.
International Search Report and Written Opinion for application No. PCT/CA2015/051340, dated Feb. 23, 2016 issued by the Canadian Intellectual Property Office.
International Search Report with Written Opinion for PCT/CA2016/050462, dated Jul. 6, 2016.

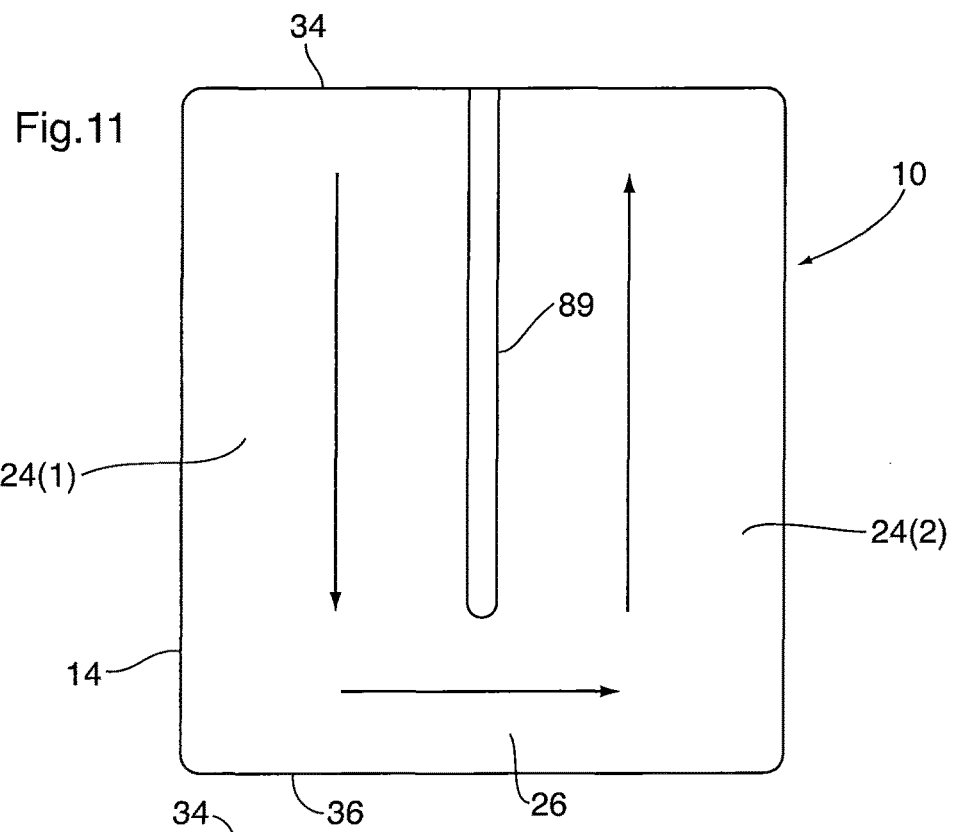
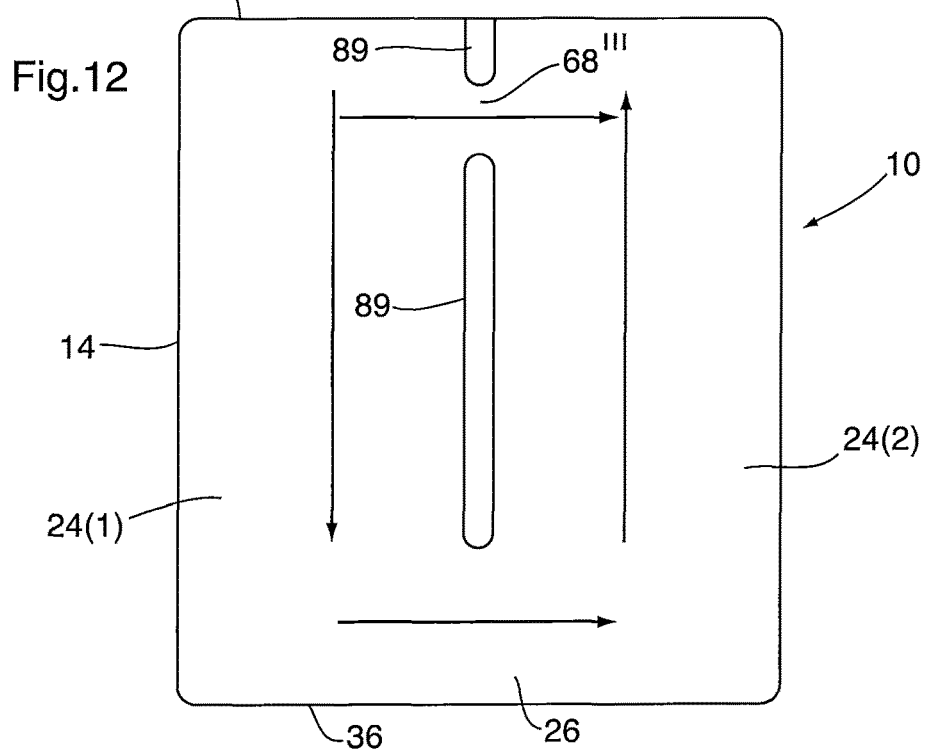

HEAT EXCHANGERS FOR BATTERY THERMAL MANAGEMENT APPLICATIONS WITH INTEGRATED BYPASS

CROSS-REFERENCE TO RELATED APPLICATION

This application claims priority to and the benefit of United States Provisional Patent Application No. 62/332,826 filed May 6, 2016, the contents of which are incorporated herein by reference.

TECHNICAL FIELD

This disclosure relates to heat exchangers for battery thermal management applications having integrated bypass features that provide additional control as to the amount of fluid that is directed through the heat exchangers to achieve specific cooling effects and/or meet specific pressure drop parameters for a particular application.

BACKGROUND

Rechargeable batteries such as batteries made up of many lithium-ion cells can be used in many applications, including for example, electric propulsion vehicle ("EV") and hybrid electric vehicle ("HEV") applications. Lithium-ion batteries in electric or hybrid electric vehicles typically generate large amounts of heat that needs to be dissipated, therefore these types of batteries or battery systems need to be cooled to extend their service life.

Liquid cooled heat exchangers, such as cold plate heat exchangers, can be used to manage the thermal load of the batteries used in these types of battery systems. Cold plate heat exchangers are heat exchangers upon which a stack of adjacent battery cells or battery cell containers each housing one or more battery cells are arranged for cooling and/or regulating the temperature of a battery unit. The individual battery cells or battery cell containers are generally arranged adjacent to each other in face-to-face or surface-to-surface contact with each other to form the battery stack, the stack of battery cells or battery cell containers being arranged on top of the cold plate heat exchanger such that an end face or end surface of each battery cell or battery cell container is in surface-to-surface contact with a surface of the heat exchanger.

Temperature uniformity across the surface of battery cooling heat exchangers is an important consideration in the thermal management of these types of battery units or overall battery systems as temperature uniformity across the surface of the heat exchanger relates to ensuring that there is a minimum temperature differential between the individual battery cells in the overall battery unit. In electric and/or hybrid electric vehicle applications vehicles that have multiple battery packs of different sizes, each battery pack does not generate the same thermal load and so, in turn, the coolant flow rate to each cold plate does not necessarily need to be the same. Therefore, since each heat exchanger or cold plate in the battery system may not require the same coolant flow rate, it may be desirable to bypass some of the coolant flow away from one or more heat exchangers within the system in an effort to ensure a more uniform temperature distribution and to mitigate pressure drop within the overall system. Accordingly, heat exchangers having bypass structures incorporated therein are desirable and may be considered useful for these types of applications, in particular.

SUMMARY OF THE PRESENT DISCLOSURE

In accordance with an example embodiment of the present disclosure there is provided a heat exchanger for battery thermal management applications, comprising a heat exchanger core defining at least one internal, two-pass flow passage, the at least one internal, two-pass flow passage having an inlet end and an outlet end and at least a first flow passage portion and at least a second flow passage portion interconnected by a generally U-shaped turn portion; an inlet manifold in fluid communication with the inlet end of said internal flow passage for delivering an incoming fluid stream to the heat exchanger; an outlet manifold in fluid communication with the outlet end of the internal flow passage for discharging an outgoing fluid stream from the heat exchanger; and a bypass passage fluidly interconnecting the incoming fluid stream and the outgoing fluid stream, the bypass passage allowing fluid from the incoming fluid stream to be diverted to the outlet manifold bypassing the at least one internal, two-pass flow passage of the heat exchanger.

BRIEF DESCRIPTION OF THE DRAWINGS

Reference will now be made, by way of example, to the accompanying drawings which show example embodiments of the present application, and in which:

FIG. 11 is a schematic top plan view of a standard U-flow heat exchanger without an integrated bypass feature;

FIG. 12 is a schematic top plan view of a U-flow heat exchanger according to another example embodiment of the present disclosure with integrated bypass;

Similar reference numerals may have been used in different figures to denote similar components.

DESCRIPTION OF EXAMPLE EMBODIMENTS

Figure 1:
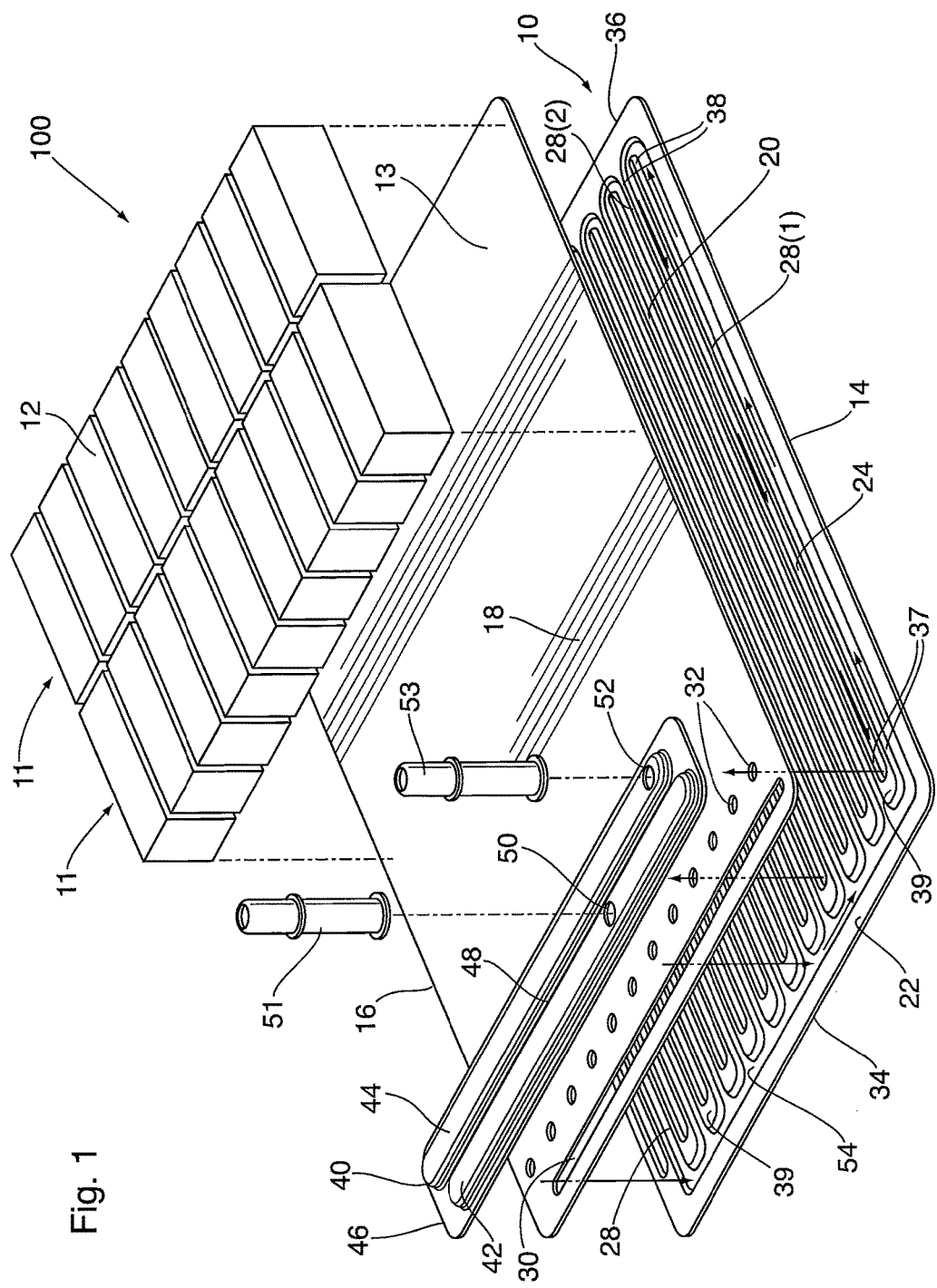
FIG. 1 is a perspective view of a battery unit incorporating an exemplary counter-flow battery cooling heat exchanger without a bypass.

Referring now to FIG. 1, there is shown an illustrative example of a rechargeable battery unit 100 employing a battery cooling heat exchanger 10. The battery unit 100 is made up of a series of individual battery cell containers 12 that may each house one or more battery cells (not shown). As shown, the battery cooling heat exchanger (or cold plate heat exchanger) 10 is arranged underneath the one or more stacks 11 of battery cells or battery cell containers 12. Accordingly, the plurality of battery cells or battery cell containers 12 in each stack 11 are arranged adjacent to one another in face-to-face or surface-to-surface contact with each other to form the stack 11, the stack of battery cells or battery cell containers 12 then being arranged on top of the cold plate heat exchanger 10 such that an end face or end surface of each battery cell or battery cell container 12 is in surface-to-surface contact with a primary heat transfer surface 13 of the heat exchanger 10.

The heat exchanger 10 is formed of two main heat exchanger plates, namely a formed base plate 14 and a generally flat cover plate 16. Cover plate 16 has a central, generally planar region 18 that provides a generally flat surface upon which the individual battery cells or battery cell containers 12 are stacked. The central, generally planar region 18 of the cover plate 16 therefore serves as the primary heat transfer surface 13 for the battery cooling heat exchanger 10.

The base plate 14 is also provided with a central, generally planar portion 20 that is surrounded by a raised peripheral flange 22. The central, generally planar portion 20 of the base plate 14 is provided with a plurality of spaced apart ribs 28 which define a plurality of fluid flow passages 24. The ribs 28 extend upwardly out of the plane of the central, generally planar portion 20 and have a sufficient height such that the top surface of each rib 28 is substantially co-planar with the peripheral flange 22. Thus, during assembly of heat exchanger 10, the peripheral flange 22 and the top surfaces of the ribs 28 are sealingly joined to the cover plate 16, such that the cover plate 16 defines the top walls of the fluid flow passages 24, the central, generally planar portion 20 of the base plate 14 defines the bottom walls of the fluid flow passages 24, and the sidewalls of the ribs 28 and peripheral flange 22 define the sides of the fluid flow passages 24. The top surfaces of the ribs 28 may be flat or rounded.

The fluid flow passages 24 of base plate 14 may have various configurations. In the embodiments disclosed herein the inlet and outlet of the heat exchanger 10 (described further below) are located at the same end of the heat exchanger, and therefore the fluid flow passages 24 are configured such that the cooling fluid flows from the inlet toward the opposite end of the heat exchanger 10, and then back toward the outlet. Thus, in the embodiments described herein, the base plate 14 is configured for "U-flow" or "counter-flow", such that the cooling fluid makes two passes along the length of base plate 14 as it flows from the inlet to the outlet.

Figure 2:
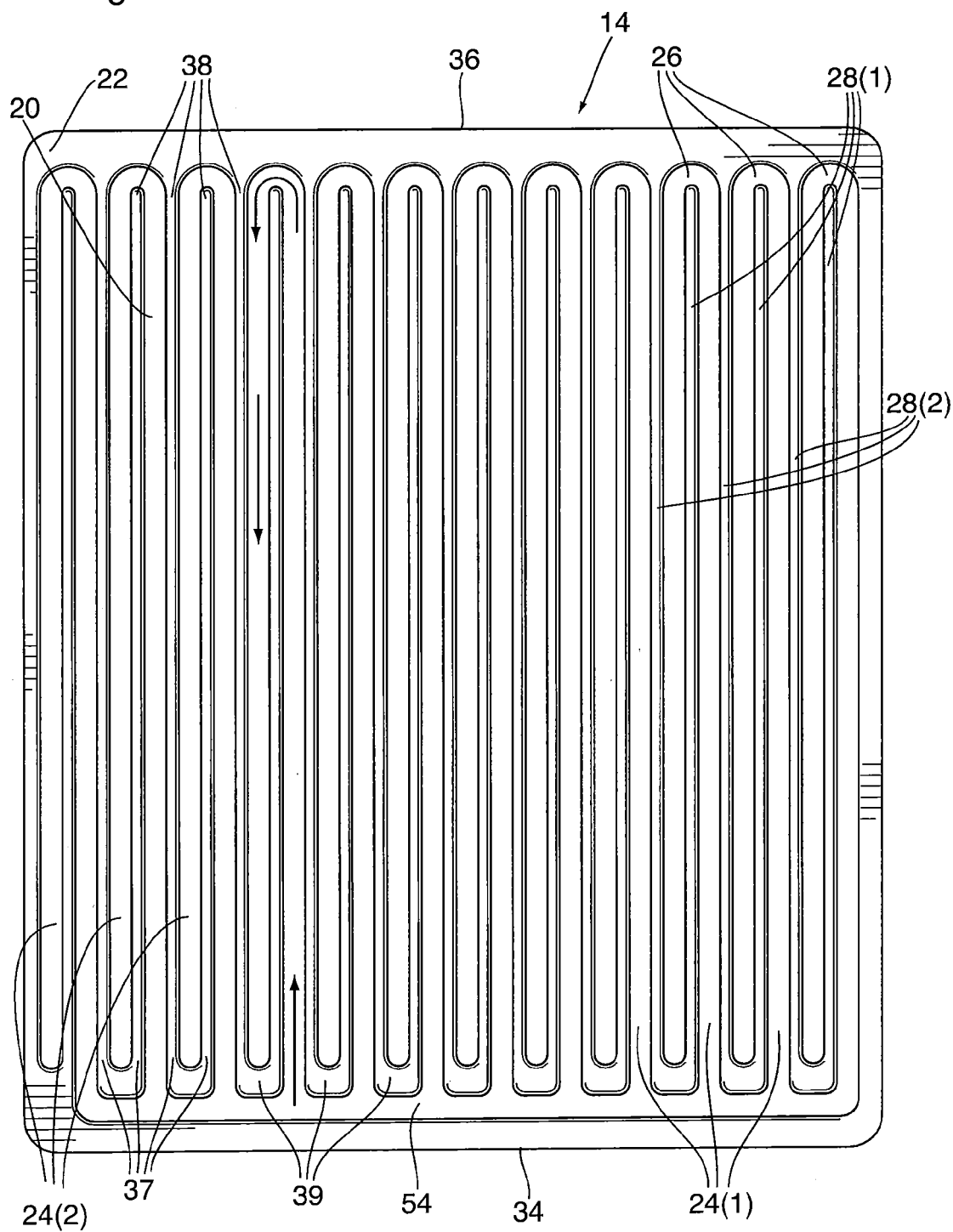
FIG. 2 is a top plan view of an exemplary base plate for use in the battery cooling heat exchanger of FIG. 1 and in the battery cooling heat exchangers according to other embodiments disclosed herein.

The embodiment illustrated in FIGS. 1-2 is configured for counter-flow of coolant through the fluid-flow passages 24. Counter-flow battery cooling heat exchangers are described in Applicant's co-pending U.S. application Ser. No. 14/972,463 filed Dec. 17, 2015, published on Jul. 14, 2016 as US 2016/0204486, the contents of which are hereby incorporated herein by reference. In counter-flow battery cooling heat exchanger 10, the base plate 14 has a first end 34 and a second end 36 which are longitudinally spaced apart, with the inlet and outlet defined proximate to the first end 34. Similarly, the ribs 28 of base plate 14 each have a first end 37 proximate to the first end 34 of the base plate 14 and an opposite second end 38 proximate to the second end 36 of the base plate 14. In the present embodiment, the ribs 28 of base plate 14 are straight, however, this is not essential and depends on the requirements of the specific application.

The base plate 14 in the embodiment of FIGS. 1 and 2 has two types of ribs 28: (a) a plurality of first ribs 28(1), each having its first end 37 spaced from the peripheral flange 22 at the first end 34 of the base plate 14, and its second end 38 spaced from the peripheral flange 22 at the second end 36 of the base plate 14; and (b) a plurality of second ribs 28(2), each having its first end 37 spaced from the peripheral flange 22 at the first end 34 of the base plate 14, and its second end 38 joined to the peripheral flange 22 at the second end 36 of the base plate 14. The first and second ribs 28(1) and 28(2) are arranged in alternating order across the width of the base plate 14, with the first end 37 of each first rib 28(1) being joined to the first end 37 of an adjacent second rib 28(2) by a transverse rib portion 39.

As can be seen from FIGS. 1 and 2, the base plate 14 has a first manifold area 54 defined at the first end 34 thereof, between the peripheral flange 22 and the first ends 37 of the ribs 28(1) and 28(2) joined by transverse rib portions 39. The first manifold area 54 extends continuously across substantially the entire width of the base plate 14. Also, there is a plurality of turnaround areas 26 at the second end 36 of the base plate 14, each of the turnaround areas 26 being located between the peripheral flange 22 and the second end 38 of one of the first ribs 28(1). The turnaround areas 26 are separated from one another by the second ribs 28(2) which are joined to the peripheral flange 22 at their second ends 38.

With this arrangement of first and second ribs 28(1) and 28(2), the base plate 14 defines a first plurality of fluid flow passages 24(1), each extending between the first manifold area 54 and one of the turnaround areas 26; and a second plurality of fluid flow passages 24(2), each extending between one of the turnaround areas 26 and one of the transverse rib portions 39 joining the first ends 37 of an adjacent pair of ribs 28(1), 28(2). The first and second fluid flow passages 24(1), 24(2) alternate with one another across the width of the base plate 14, thus defining the counter-flow flow configuration of base plate 14.

The cover plate 16 of heat exchanger 10 is provided with one or more first openings 30 and a plurality of spaced second openings 32 to provide fluid input and output to and from the fluid flow passages 24. In heat exchanger 10, the one or more first openings 30 defines an inlet to the first plurality of fluid flow passages 24(1), and the plurality of second openings 32 defines an outlet from the second plurality of fluid flow passages 24(2). In the illustrated embodiment, the one or more first openings 30 comprises a continuous slot which is located directly above the first manifold area 54 of the base plate 14. Fluid entering the first manifold area 54 through the one or more first openings 30 is distributed along the length of first manifold area 54 to each of the first fluid flow passages 24(1), and flows toward the second end 36 of the base plate 14, changing direction in turnaround areas 26, and then flowing back toward the first end 34 of the base plate 14. Each of the spaced second openings 32 is located directly above one of the second fluid flow passages 24(2), in the vicinity of a transverse rib portion 39 and the second ends 38 of ribs 28. In this way, cooling fluid flowing through each of the second fluid flow passages 24(2) exits the heat exchanger 10 through one of the spaced second openings 32.

Heat exchanger 10 further comprises a manifold cover 40 arranged on top of the cover plate 16 directly over top of the first and second openings 30, 32. Manifold cover 40 has an elongate structure and extends transversely across the cover plate 16. The manifold cover 40 comprises a peripheral flange 46 surrounding a pair of spaced-apart embossments 42, 44, each having a longitudinal axis extending transversely across the cover plate 16. The flange 46 defines a bottom planar sealing surface which is sealingly joined to an area of the cover plate 16 surrounding the first and second openings 30, 32. The embossments 42, 44 are raised relative to the flange 46 and form respective inlet and outlet manifolds. The first embossment 42 is located directly over top of the one or more first openings 30 of the cover plate 16 and the first manifold area 54 of the base plate 14, thereby defining an inlet manifold in the present embodiment. The second embossment 44 is located directly over top of the plurality of spaced second openings 32 and the ends of the second fluid flow passages 24(2) in the vicinity of transverse rib portions 39, thereby defining an outlet manifold.

The first and second embossments 42, 44 are separated from one another by a planar, intermediate region 48 that extends transversely between the pair of embossments 42, 44, and which has a bottom surface sealingly joined to an area of the cover plate 16 which extends along a transverse line located between the one or more first openings 30 and the plurality of spaced second openings 32. In the present embodiment, the bottom surface of the intermediate region 48 is continuous and is joined at its opposite ends to the peripheral flange 46, so as to completely separate the embossments 42, 44 from one another. Therefore, there is no fluid communication between the embossments 42, 44 except through the fluid flow passages 24, and therefore no bypass flow.

Accordingly, when the manifold cover 40 is arranged on top of the cover plate 16, the first and second embossments 42, 44 each form an open interior manifold space for delivering/discharging the heat exchange fluid to/from the flow passages 24 via first and second openings 30, 32. A fluid opening 50, 52 is formed in each respective embossment 42, 44 for providing fluid access to the open interior spaces defined by the first and second embossments 42, 44 when the manifold cover 40 is arranged in sealed mating relationship with cover plate 16. The fluid opening 50 formed in embossment 42 provides an inlet opening and the fluid opening 52 in embossment 44 provides an outlet opening. The fluid openings 50, 52 may be provided with tubular inlet and outlet fittings 51, 53 for connection to the vehicle's coolant circulation system (not shown).

Fluid openings 50, 52 can each be formed at any location along the length of the respective embossment 42, 44 so as to correspond to the specific locations desired for the inlet and outlet fittings for the heat exchanger 10 based on customer or application specific requirements. FIG. 1 illustrates both the inlet and outlet openings 50, 52 being located on the same side of the heat exchanger 10, but it will be understood that the openings 50, 52 could be positioned anywhere along the longitudinal axes of embossments 42, 44. Accordingly, in the example embodiment shown in FIGS. 1 and 2, fluid entering the heat exchanger 10 enters through inlet fitting 51 and fluid opening 50 in embossment 42 where it travels along the open interior space formed underneath the embossment 42 to the one or more first openings 30 formed in the cover plate 16 that is located directly over the first manifold area 54, in fluid communication with the inlet ends of the first flow passages 24(1). The fluid then travels through the first flow passages 24(1) and changes direction in the turnaround areas 26 and enters the second flow passages 24(2). The fluid then flows through the second flow passages 24(2) in a direction opposite to the flow direction in the first flow passages 24(1) and exits the second flow passages 24 through the plurality of second openings 32 in cover plate 16, where it then travels through the open interior space formed by embossment 44 and is discharged through outlet opening 52 and outlet fitting 53.

Figure 3:
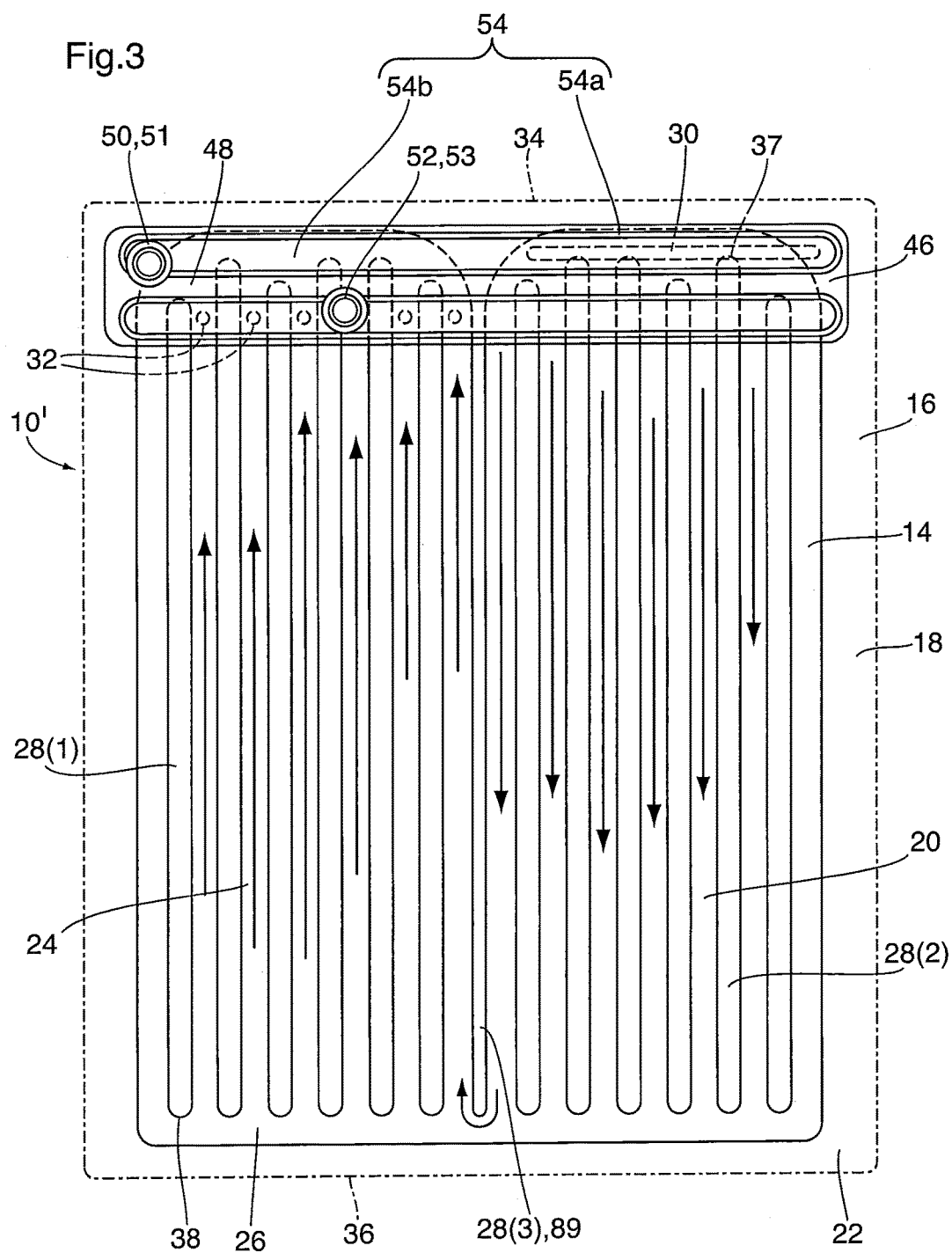
FIG. 3 is a top plan view of an exemplary U-flow battery cooling heat exchanger without a bypass.
Figure 4:
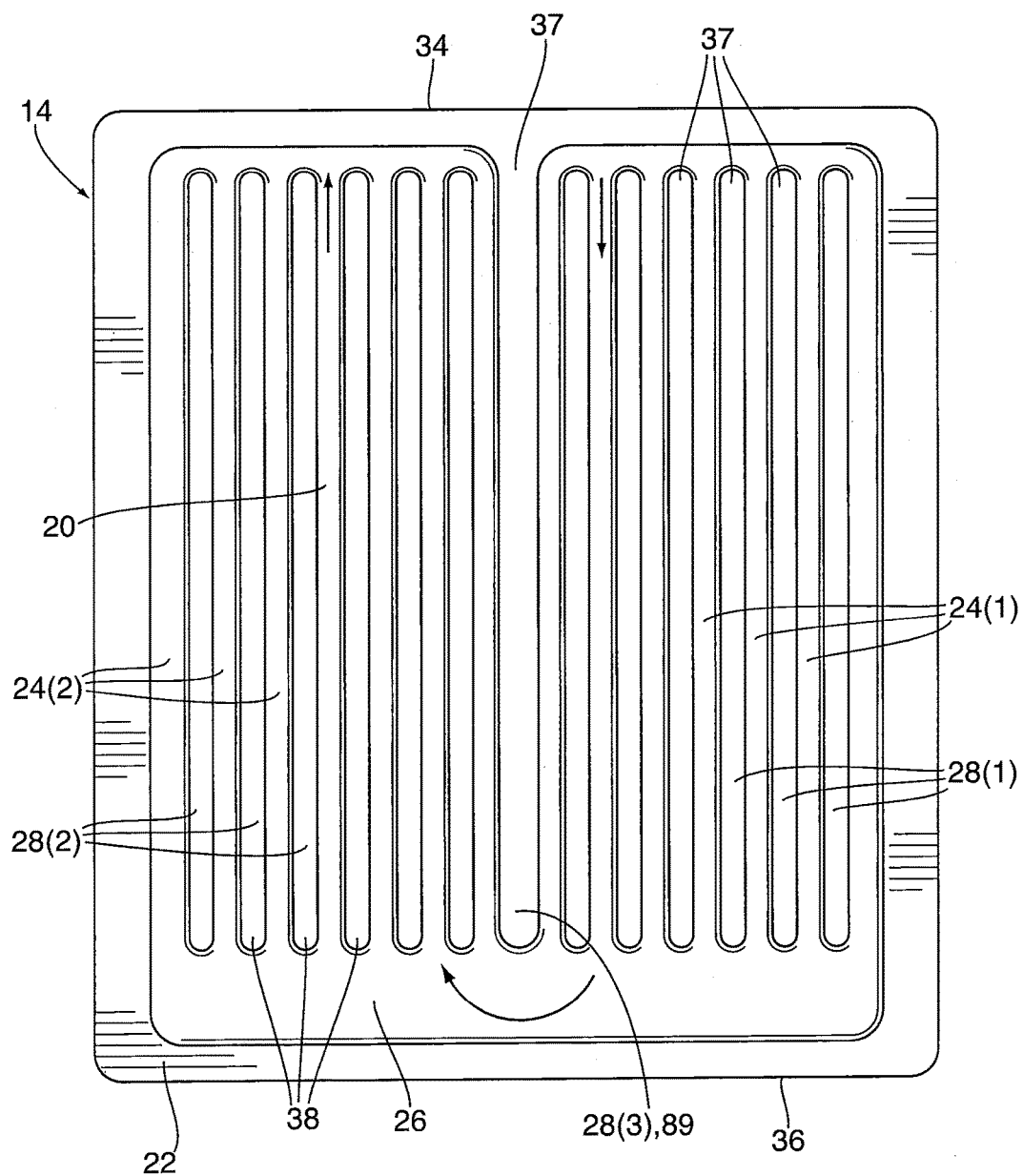
FIG. 4 is a top plan view of an exemplary base plate for use in the battery cooling heat exchanger of FIG. 3.

The heat exchanger 10' illustrated in FIGS. 3-4 is configured for U-flow of coolant through a U-shaped fluid flow passage 24. In FIGS. 3 and 4 and the following description, like elements of heat exchangers 10, 10' are identified by like reference numerals, and the above descriptions of these like elements applies to the present embodiment. In this embodiment, the base plate 14 has two types of ribs 28: (a) a plurality of first ribs 28(1), each having a first end 37 spaced from the peripheral flange 22 at the first end 34 of the base plate 14, and a second end 38 spaced from the peripheral flange 22 at the second end 36 of the base plate 14; (b) a plurality of second ribs 28(2) with the same configuration as the first ribs 28(1); and (c) a dividing rib 28(3) located between the pluralities of first and second ribs 28(1), 28(2), the dividing rib 28(3) having a first end 37 which is joined to the peripheral flange 22 at the first end 34 of the base plate 14, and having a second end 38 which is spaced from the peripheral flange 22 at the second end 36 of the base plate 14. The dividing rib 28(3) is also sometimes referred to herein as flow barrier 89.

With this arrangement, the central, generally planar portion 20 of the base plate 14 defines a generally U-shaped flow passage 24 having a first flow passage portion 24(1) defined by the plurality of first ribs 28(1) interconnected to a second flow passage portion 24(2) by a generally U-shaped turn portion 26. The first flow passage portion 24(1) is separated or fluidly isolated from the second flow passage portion 24(2) by the flow barrier 89 that extends between the two flow passage portions 24(1), 24(2), and is defined by the dividing rib 28(3). The U-shaped flow passage 24 is formed so as to be depressed out of or extend, downwardly out of the plane of the base plate 14, the peripheral flange 22 therefore lying in a different plane to that of the flow passage 24. Accordingly, when the base plate 14 and cover plate 16 are arranged in their mating relationship, the flow passage 24 is enclosed therebetween. The top surfaces of the ribs 28 are substantially co-planar with the peripheral flange 22 so as to be sealed to the cover plate 16 in the same manner as the ribs 28 of the counter-flow heat exchanger 10 described above, and may have flat or rounded top surfaces.

A first manifold area 54 is defined at the first end 34 of the base plate 14, between the first ends 37 of ribs 28(1), 28(2) and the peripheral flange 22. Because the first end 37 of dividing rib 28(3) or flow barrier 89 is joined to the peripheral flange 22, the first manifold area 54 is separated into two segments 54a, 54b which are fluidly isolated from one another. The first segment 54a of first manifold area 54 is in fluid communication with all the channels making up the first flow passage portion 24(1), while the second segment 54b of first manifold area 54 is in fluid communication with all the channels making up the second flow passage portion 24(2). The dividing rib 28(3) or flow barrier 89 has a second end 38 which is spaced from the peripheral flange 22 at the second end 36 of base plate 14, and therefore the generally U-shaped turn portion 26 extends continuously across substantially the entire width of the base plate 14, providing fluid communication between the two flow passage portions 24(1), 24(2), and defining a continuous second manifold area at the second end 36 of the base plate 14, which is in fluid communication with all the channels of the first and second flow passage portions 24(1), 24(2).

In order for fluid to gain access to the flow passage 24, one or more first fluid openings 30 and one or more second fluid openings 32 are formed in the cover plate 16 so that when the base plate 14 and cover plate 16 are arranged in their mating relationship, the one or more first openings 30 provide fluid access to an inlet end of flow passage 24, e.g. segment 54a of the first manifold area 54, and first flow passage portion 24(1), for delivering a heat exchange fluid (e.g. liquid coolant) to the heat exchanger 10, while the one or more second fluid openings 32 provide fluid access to an outlet end of the flow passage 24, e.g. segment 54b of the first manifold area 54, and second flow passage portion 24(2) for discharging the heat exchange fluid from the heat exchanger 10. More specifically, the one or more first openings 30 is located directly above the first flow passage portion 24(1), to the right side of flow barrier 89, proximate to the first end 34 of the base plate 14, and the one or more second openings 32 are located directly above the second flow passage portion 24(2), to the left side of flow barrier 89, proximate to the first end 34 of the base plate 14. Each of the one or more first and second openings 30, 32 may comprise a single aperture, an elongated slot or a plurality of spaced openings, as shown in FIG. 3. As shown in FIG. 3, the one or more first openings 30 are provided directly over only the first flow passage portion 24(1) while the one or more second openings 32 are provided directly over only the second flow passage portion 24(2).

A manifold cover 40 is arranged on top of the cover plate 16 over top of the one or more first and second openings 30, 32. In the subject embodiment, the manifold cover 40 is shown as being identical to manifold cover 40 of the heat exchanger 10 shown in FIGS. 1 and 2, including fittings 51, 53. When manifold cover 40 is arranged on top of cover plate 16, the first and second embossments 42, 44 each form an open interior space for delivering/discharging the heat exchange fluid to/from the U-shaped flow passage 24 via one or more first and second openings 30, 32.

The provision of manifold cover 40 permits the fluid openings 50, 52 to be formed at any location along the length of the respective embossment 42, 44. It will be appreciated, however, that manifold cover 40 is optional in the present embodiment. For example, a single first opening 30 could be provided directly over the first flow passage portion 24(1) and a single second opening 32 could be provided directly over the second flow passage portion 24(2), and the fittings 51, 53 could be directly attached to the cover plate 16 and sealed to the openings 30, 32, in the manner shown in FIG. 14. In such an embodiment which does not include a manifold cover 40, the openings 30, 32 may be provided in embossments formed in the cover plate 16, the embossments being located on either side of the flow barrier 89.

In the present embodiment, cooling fluid entering the heat exchanger 10 enters through inlet fitting 51 and fluid opening 50 in embossment 42 where it travels along the open interior space formed underneath the embossment 42 to the one or more first openings 30 formed in the cover plate 16 that corresponds to the inlet end of the first flow passage portion 24(1). The fluid then travels along the first flow passage portion 24(1), as illustrated by directional flow arrows in FIG. 4, before flowing through the continuous U-turn portion 26 formed at the opposed end of the heat exchanger 10 where it enters the second flow passage portion 24(2). The fluid then flows along the second flow passage portion 24(2) in a direction opposite to the flow direction in the first flow passage portion 24(1) and exits the flow passage 24 through the one or more second openings 32 in cover plate 16 where it then travels through the open interior space formed by embossment 44 where it is discharged through outlet opening 52 and outlet fitting 53. As in the previously-described embodiment, the embossments 42, 44 are completely separated from one another by the intermediate portion 48. Therefore, there is no fluid communication between the embossments 42, 44 except through the fluid flow passage 24, and therefore no bypass flow.

Figure 5:
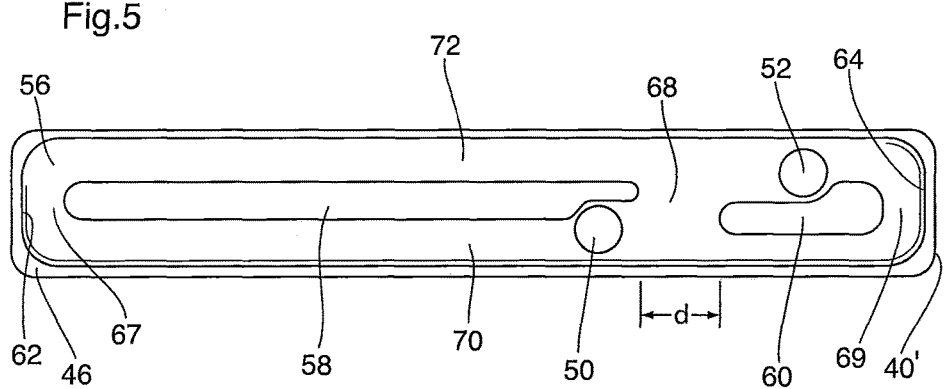
FIG. 5 is a bottom plan view of a manifold structure with integrated bypass feature according to an exemplary embodiment of the present disclosure.
Figure 6:
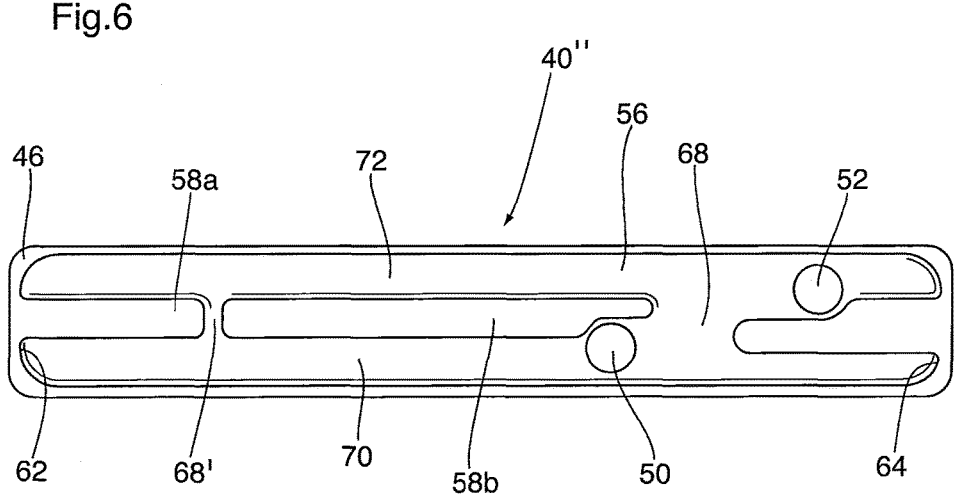
FIG. 6 is a bottom plan view of a manifold structure with integrated bypass feature according to another exemplary embodiment of the present disclosure.
Figure 7:
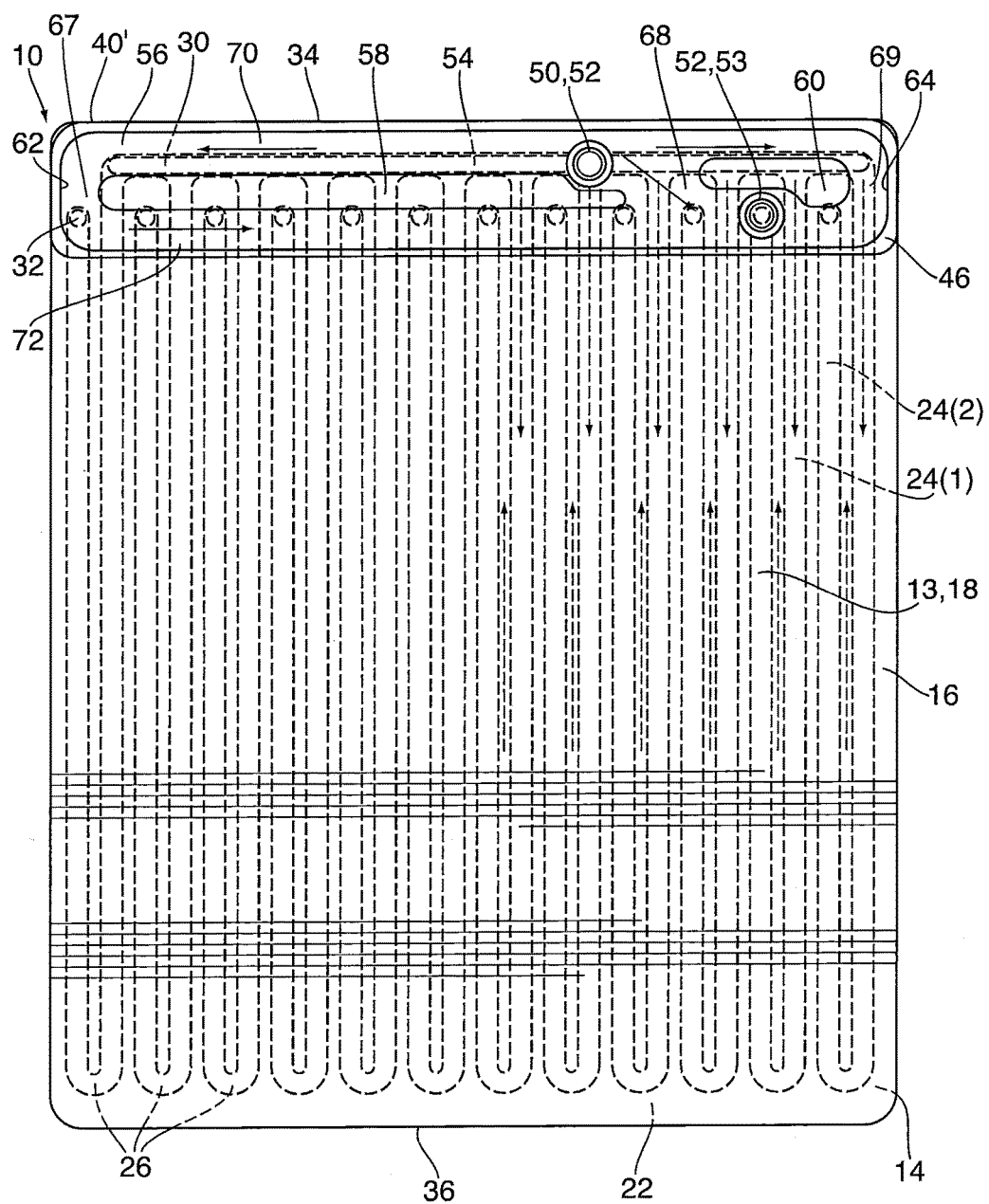
FIG. 7 is a top plan view of a battery cooling heat exchanger incorporating the manifold structure of FIG. 5.
Figure 8:
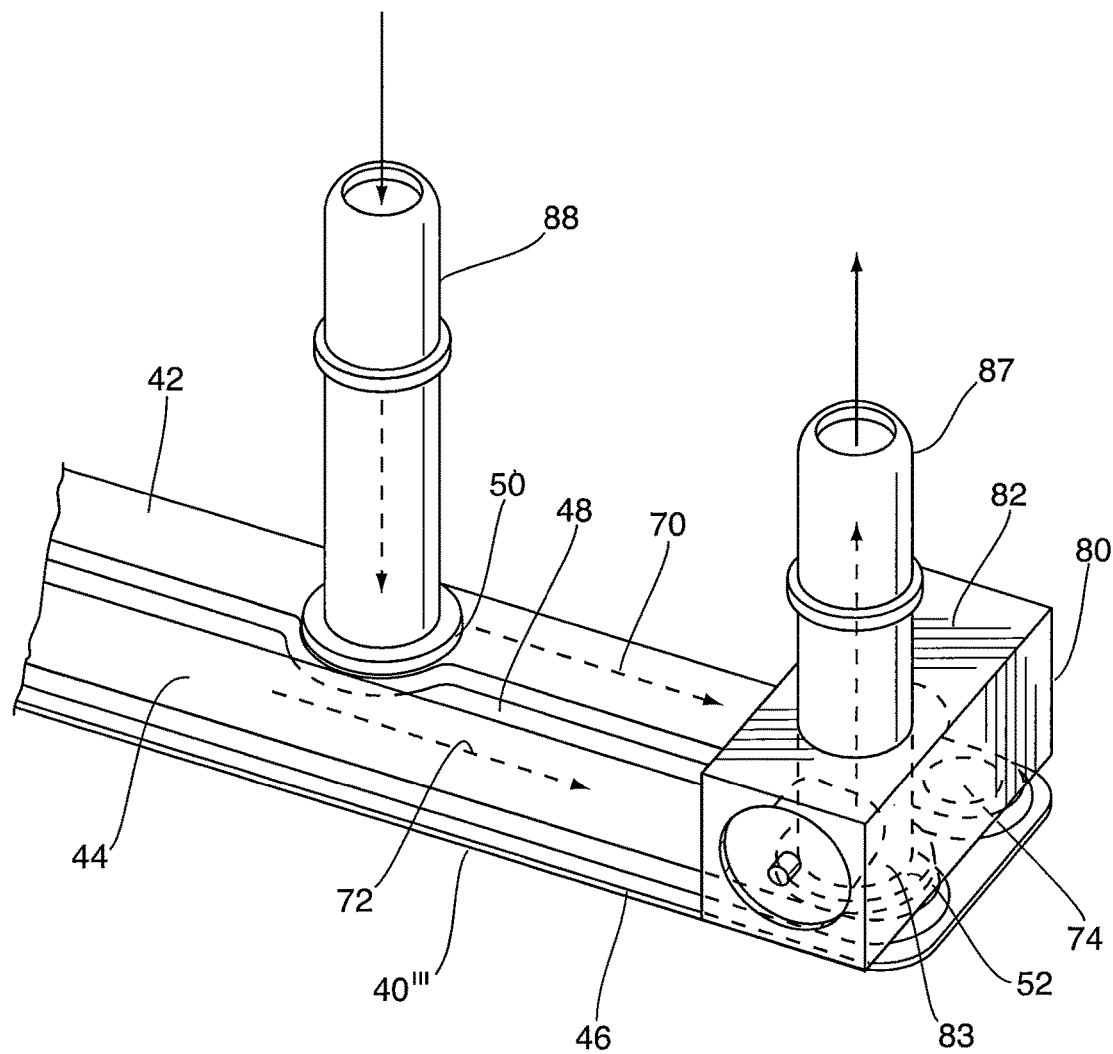
FIG. 8 is a detail, perspective view of the bypass portion of a manifold structure with integrated bypass feature according to another exemplary embodiment of the present disclosure.
Figure 9:
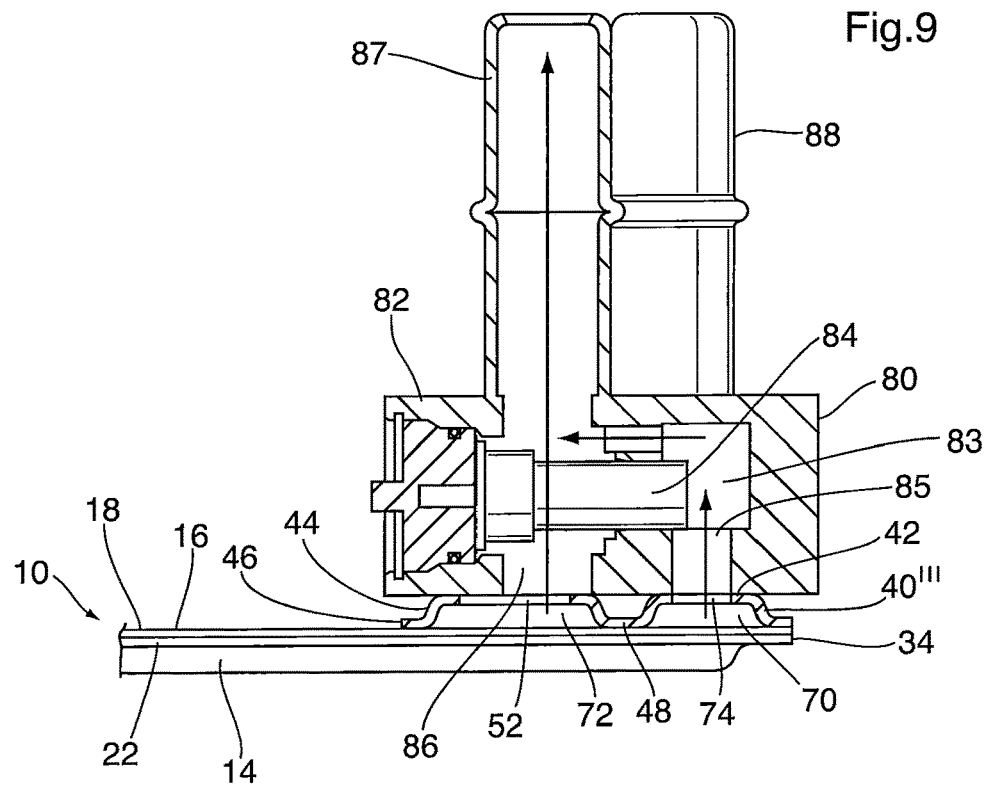
FIG. 9 is a partial cross-sectional view of a battery cooling heat exchanger with the manifold structure of FIG. 8, illustrating a first operational state.

Referring now to FIGS. 5 and 7, there is shown a modified manifold cover plate 40' according to an example embodiment of the present disclosure that incorporates a bypass structure to assist with dictating the amount of heat exchange fluid (e.g. liquid coolant) that is directed to the internal flow passage(s) 24 within the heat exchanger 10, wherein the flow passage(s) 24 may be configured for counter-flow or U-flow as described above. In FIG. 5 and the following description, like elements are identified by like reference numerals, and the above descriptions of these like elements applies to the present embodiment. In addition to being used in place of manifold cover 40 described above, manifold cover 40' may be used in place of the manifold plate(s) or manifold cover(s) used in conjunction with the embodiments of the battery cooling heat exchanger shown in FIGS. 3-6; FIGS. 7-9; FIGS. 12-19; and FIGS. 20-22 of Applicant's co-pending U.S. application Ser. No. 14/972, 463.

In some applications, it is not necessary for all of the available heat exchange fluid or liquid coolant to pass through the battery cooling heat exchanger 10 as the amount of cooling required may depend on the amount of heat generated by a particular battery stack 11 within the overall system or vehicle. As well, when it is desirable to minimize overall pressure drop through the battery cooling system, incorporating a mechanism that allows some of the fluid to be diverted away from the heat exchanger and provides some control over the amount of fluid that is directed to the flow passage(s) 24 of the battery cooling heat exchanger 10 may be useful.

Rather than having two separate embossments 42, 44 separated by a peripheral flange 46 and intermediate portion 48 to provide two distinct and separate open, interior spaces that serve as inlet and outlet manifolds, manifold cover 40' has an inverted dished-shaped structure with a raised, central generally planar portion or main embossment 56 surrounded by peripheral flange 46. In the subject embodiment, first and second flow barriers 58, 60 are formed within the boundaries of the main embossment 56 and are downwardly depending or depressed with respect to the raised, central generally planar portion or main embossment 56. Accordingly, the first and second flow barriers 58, 60 each have a bottom or lower surface that lies generally in the same plane as the peripheral flange 46. As a result, the peripheral flange 46 and the first and second flow barriers 58, 60 are in sealing contact with the cover plate 16 when arranged on top thereof providing an enclosed manifold structure.

Both the first and second flow barriers 58, 60 are arranged and extend generally along the central or longitudinal axis of the raised, central generally planar portion or main embossment 56 of the manifold cover 40' and are spaced apart from the respective ends 62, 64 thereof. Like the intermediate region 48 of manifold cover 40, the flow barriers 58, 60 extend transversely along cover plate 16 with their bottom surfaces sealingly joined to an area of the cover plate 16 which extends along a transverse line located between the one or more openings 30 and the plurality of spaced openings 32. The first flow barrier 58 extends from proximal to the first end 62 of the raised, central generally planar portion or main embossment 56 of the manifold cover 40' for a first length or distance along the longitudinal axis thereof, while the second flow barrier 60 extends from proximal to the second or opposite end 64 of the raised, central generally planar portion or main embossment 56 of the manifold cover 40' for a second length or distance along the longitudinal axis thereof. In the subject embodiment, the first length associated with the first flow barrier 58 is greater than the second length associated with the second flow barrier 60. As a result of the different lengths of the first and second flow barriers 58, 60, the first and second flow barriers 58, 60 are spaced apart from each other along the central or longitudinal axis of the raised, central generally planar portion or main embossment 56 by a distance d forming a gap or bypass channel 68 therebetween. While the first flow barrier 58 is greater in length than the second flow barrier 60 thereby forming a bypass channel 68 having a particular width d, it will be understood that the actual lengths of the respective flow barriers 58, 60 and the actual resulting size/width of the bypass channel 68 formed therebetween may vary in order to achieve a particular flow rate through the manifold structure as will be discussed in further detail below.

Fluid openings 50, 52 are formed in the raised, central generally planar portion or main embossment 56 of the manifold cover 40' with one of the openings 50, 52 being formed on one side of the flow barriers 58, 60 and with the other opening 50, 52 being formed on the opposite side of the flow barriers 58, 60. Accordingly, the first and second flow barriers 58, 60 form a first manifold flow channel 70 on one side thereof and a second manifold flow channel 72 on the other side thereof with the first manifold flow channel 70 being in direct fluid communication with the one of the fluid openings 50, 52 formed therein and with the second manifold channel 72 being in direct fluid communication with the other one of the fluid openings 50, 52. However, due to the particular arrangement of the first and second flow barriers 58, 60, the first and second manifold flow channels 70, 72 are not fluidly isolated from each other, as in the case of the manifold cover 40 shown in FIGS. 1-4, but are interconnected by bypass channel 68 as well as at gaps 67, 69 formed at the respective ends 62, 64 of the raised, central generally planar portion or main embossment 56 around the corresponding ends of the first and second flow barriers 58, 60. Therefore, while fluid entering the heat exchanger 10 through fluid inlet opening 50 formed in the manifold cover 40' travels through the first manifold flow channel 70 and is distributed to the internal flow channel(s) 24 enclosed within the heat exchanger 10, this incoming fluid can also be directed directly to the fluid outlet opening 52 located in the second manifold flow channel 72 by way of bypass channel 68, effectively bypassing the internal flow passage(s) 24 of the heat exchanger 10. Incoming fluid can also be directed directly to the second manifold flow channel 72 by way of the gaps 67, 69 formed between the ends 62, 64 of the raised, central generally planar portion or main embossment 56 and the corresponding, adjacent end of the first or second flow barrier 58, 60.

Fluid openings 50, 52 can be located at any location along each of the first and second manifold flow channels 70, 72 depending upon the desired location for the external inlet and outlet fittings of the heat exchanger 10. The locations of the fluid openings 50, 52 can also be specifically selected in relation to the specific location of the bypass channel 68 in order to achieve the desired flow pattern through the manifold 40' and heat exchanger 10 and/or to maintain and/or minimize a certain pressure drop through the overall battery cooling system.

FIG. 7 shows the manifold cover of FIG. 5 in a heat exchanger 10 including a counter-flow base plate 14 and cover plate 16 identical to those described above with reference to FIGS. 1 and 2, and the above descriptions of these components applies equally to the heat exchanger 10 of FIG. 7.

FIG. 6 shows a manifold cover 40" according to another embodiment, which is identical to manifold cover 40' described above, except that the gaps 67, 69 are eliminated, and the each of the flow barriers 58, 60 is joined to the peripheral flange 46. In addition, the first flow barrier 58 is divided into two segments 58a, 58b separated by a gap 68'. It will be appreciated that there are many different configurations of manifold covers 40 which are within the scope of the present disclosure, i.e. with or without one or both gaps 67, 69, and/or including two or more segments so as to provide two or more bypass gaps 68. According to an alternate configuration of manifold cover 40, the flow barriers 58, 60 may be joined end-to-end so as to eliminate the bypass gap 68, while providing one or both end gaps 67, 69. The exact configuration of manifold cover 40 will depend at least partly on the desired amount of bypass flow and the desired locations of the fluid openings 50, 52 and fittings 51, 53.

Figure 10:
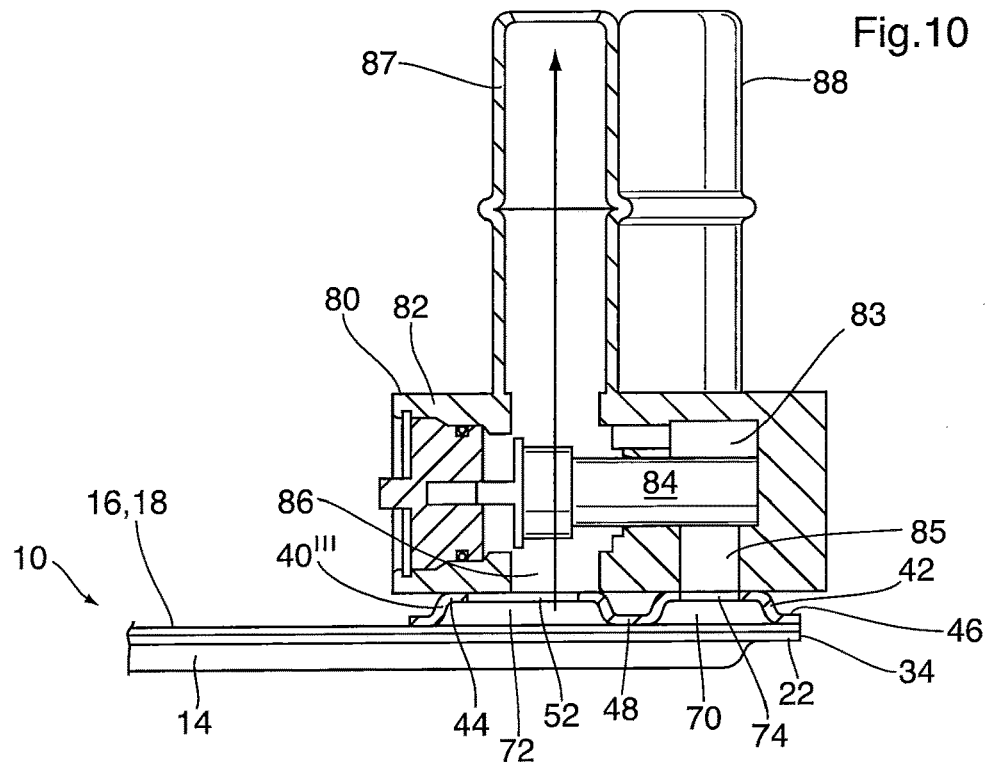
FIG. 10 is a partial cross-sectional view similar to FIG. 9 illustrating a second operational state.

Referring now to FIGS. 8-10, there is shown another example embodiment of manifold structure incorporating a bypass feature for use with a U-flow or counter-flow battery cooling heat exchanger 10, 10' as described above. Rather than including a manifold cover 40' or 40" described above having bypass channel 68 and/or one or more gaps 67, 69, the heat exchanger 10 of the present embodiment includes a manifold cover 40''', along with a thermal bypass valve component 80 to provide an integrated bypass feature. Manifold cover 40''' may be mounted on any of the counter-flow or U-flow heat exchangers 10 described above.

Manifold cover 40''' is similar in structure to manifold cover 40 described above with reference to FIGS. 1-4 and is formed with first and second embossments 42, 44 that each form an open, interior space between the inner surface of the manifold cover 40" and the cover plate 16 or outer surface of the heat exchanger 10 which serve as the first and second manifold flow channels 70, 72. However, since the first and second manifold flow channels 70, 72 are formed by separate embossments 42, 44, the first and second manifold flow channels are separated or spaced apart from each other by intermediate portion 48. A fluid opening 50, 52 is formed in each of the embossments 42, 44 for providing fluid access to each of the first and second manifold flow channels 70, 72. The embossment 42, 44 that serves as the inlet manifold, for instance embossment 42 in the illustrated embodiment of FIGS. 8-10, is also provided with a second fluid opening 74 that serves as a bypass opening, the bypass opening 74 being longitudinally spaced apart from the fluid inlet opening 50 along embossment 42 and being arranged opposite to the fluid outlet opening 52 formed in the adjacent embossment 44 that forms the second manifold flow channel 72.

Thermal bypass valve 80 is made up of an outer housing 82 having an internal valve chamber 83 formed therein for receiving a valve mechanism 84. A first fluid opening 85 has a first end in fluid communication with the bypass opening 74 formed in the manifold cover 40''' and extends into the outer housing 82, the first fluid opening 85 having a second end in fluid communication with the internal valve chamber 83. A second fluid opening 86 has a first end in fluid communication with the fluid outlet opening 52 formed in the manifold cover 40''' and extends through the outer housing 82, through the internal valve chamber 83 to outlet fitting 87. Valve mechanism 84 serves to control flow from either the bypass opening 74 and/or the fluid outlet opening 52 through the internal valve chamber 83 to outlet fitting 87. The valve mechanism 84 can be powered by either a passive wax motor or by an active solenoid valve, or any other suitable means known in the art. Valve mechanism 84 has a first, normally open position (shown in FIG. 9) where the bypass opening 74 is open with fluid being allowed to travel from the inlet manifold and first manifold flow channel 70 through the bypass opening 74 to the internal valve chamber 83 where it is directed out of the valve component 80 to outlet fitting 87. As the temperature of the fluid discharged from the heat exchanger 10 through fluid outlet opening 52 increases, the valve mechanism 84 begins to activate, closing first fluid opening 85 and bypass opening 74 until it reaches its fully closed or second operating position shown in FIG. 10. As the first fluid opening 85 and bypass opening 74 are progressively closed through the action of the valve mechanism 84, more and more fluid is directed through the internal flow passage(s) 24 of the heat exchanger 10 with the amount of bypass fluid being reduced. Once the first fluid opening 85 and bypass opening 74 are fully closed, all of the fluid entering the heat exchanger 10 through inlet fitting 88 is directed through the first manifold flow channel 70 to the internal flow passage(s) 24, the fluid then travelling through the flow passage(s) 24 before being directed to the second manifold flow channel 72 which in turn directs the fluid out of the heat exchanger 10 through fluid outlet opening 52 and the second fluid opening 86 formed in the valve component 80 to outlet fitting 87.

When the valve component 80 is controlled by a wax motor, when the coolant temperature at the outlet fitting 87 is too hot, based on a predetermined set point or temperature predefined by the type of wax, the wax expands to actuate the valve mechanism 84, causing it to close the first fluid opening 85 and bypass opening 74, causing more flow to pass through the heat exchanger 10, thereby cooling the corresponding battery cells or battery cell containers 12. When the coolant temperature at the outlet fitting 87 is too cold, as based on predefined parameters, the wax contracts and the valve mechanism 84 opens the first fluid opening 85 and bypass opening 74, causing less coolant to pass through the heat exchanger 10 as fluid is allowed pass through the bypass opening 74 directly to the outlet 87. In other configurations the valve component 80 can be controlled electronically using a solenoid valve mechanism and a temperature sensor mounted inside the fluid stream of the outlet fitting 87, for example, or with a temperature sensor mounted on the surface of the outlet fitting 87.

By incorporating a valve mechanism 84 into the bypass feature of the manifold structure 40''' additional control is provided over the amount of bypass flow that is permitted during use/operation of the heat exchanger 10 based on the temperature of the fluid flowing through the heat exchanger 10. As with the previously described embodiments, the particular location of the inlet and outlet fittings 87, 88 can be selected so as to be at any location along the respective embossments 42, 44; however, the bypass opening 74 must be located relative to outlet opening 52 in the adjacent embossment 44 so that valve component 80 can be arranged in fluid communication with each of these openings 52, 74.

In the illustrated embodiment, the openings 74 and 52 are directly opposed to one another, but this may not be required in all embodiments, depending on the structure of valve component 80.

Figure 13:
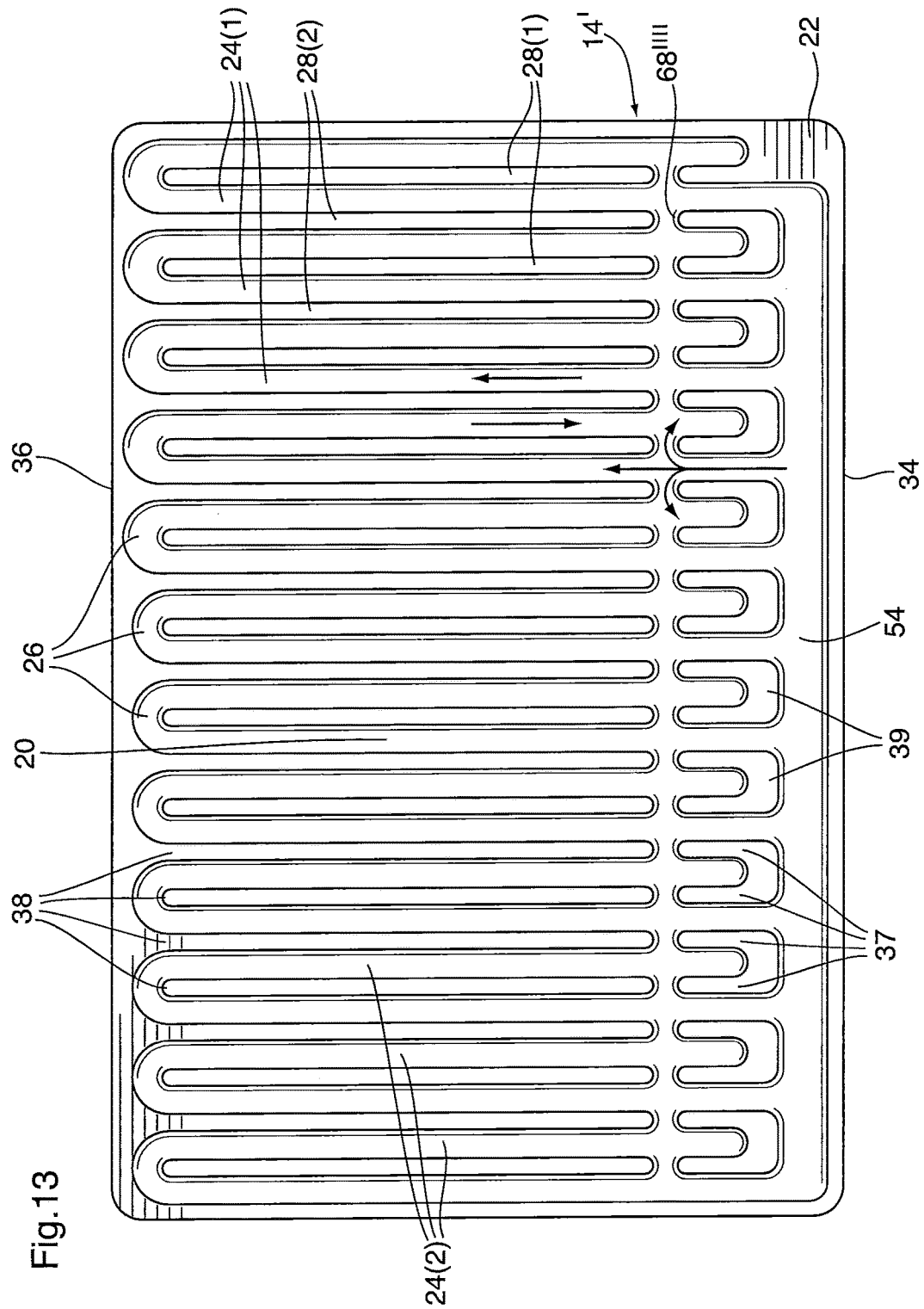
FIG. 13 is a top plan view of a modified base plate with integrated bypass for use in a heat exchanger as shown in FIG. 1.

Referring now to FIGS. 11-13, a battery cooling heat exchanger 10 having an integrated bypass feature in accordance with another exemplary embodiment of the present disclosure. In the subject embodiment, rather than having the bypass feature associated directly with the manifold structure 40', 40'', 40''' as in the previously described embodiments, the internal flow passage(s) 24 of the heat exchanger 10 may themselves be provided with an integrated bypass feature that allows for fluid communication between the flow passages 24(1) associated with a first pass of the heat exchanger 10 and the flow passages 24(2) associated with the second pass or return flow of the heat exchanger 10 (e.g the incoming and outgoing flow channels).

FIG. 11 provides a schematic illustration of the internal flow path structure for a standard U-flow heat exchanger 10 wherein incoming fluid is directed through a first flow passage portion 24(1), similar to the embodiment shown in FIGS. 2-4, to a U-turn portion 26 where it is turned approximately 180 degrees and is directed through a second flow passage portion 24(2) to the outlet manifold where it is discharged from the heat exchanger 10. Flow barrier 89 (also referred to above as dividing rib 28(3)) separates the first flow passage portion 24(1) from the second flow passage portion 24(2).

Referring now to FIG. 12, there is shown a schematic illustration of a modified U-flow heat exchanger 10 with an integrated bypass feature according to an example embodiment of the present disclosure. As shown, a bypass channel 68''' is formed in flow barrier 89 so as to establish fluid communication between the first flow passage portion 24(1) and the second flow passage portion 24(2) at a location farther upstream (i.e. closer to first end 34 of base plate 14) than the actual U-turn portion 26. Accordingly, fluid travelling through the incoming first flow passage portion 24(1) can be diverted directly to the outgoing second flow passage portion 24(2) by way of the bypass channel 68''' without having to complete the full pass through the heat exchanger 10.

Referring now to FIG. 13, there is shown a modified base plate 14' that can be used in the counter-flow heat exchanger 10 shown in FIG. 1, the modified base plate 14' having an integrated bypass feature incorporated into the internal fluid flow passages 24 themselves, similar to the U-flow heat exchanger described above in connection with FIG. 12. Other than the integrated bypass feature described below, the base plate 14' of FIG. 13 is substantially identical to that shown in FIG. 2, and like reference numerals are used to describe like elements of base plate 14'. The above description of the like elements in base plate 14 of FIGS. 1 and 2 applies to base plate 14', unless otherwise indicated below.

As shown in FIG. 13, the integrated bypass feature of base plate 14' comprises a bypass channel 68'''' that extends transversely to the flow direction of the first and second flow channels 24(1), 24(2), i.e. across the width of base plate 14', establishing fluid communication between the first plurality of fluid flow passages 24(1) and the second plurality of flow passages 24(2) at a location farther upstream (i.e. closer to first end 34 of base plate 14') than the turnaround areas 26 located at the second end 36 of the heat exchanger 10 and base plate 14. Accordingly, the bypass channel 68'''' is formed so as to be proximal to but spaced apart from the manifold end of the heat exchanger 10, i.e. the first end of base plate 14. Therefore, incoming fluid that is directed to the first plurality of fluid flow passages 24(1) through the first manifold flow channel 70 via inlet opening 50 formed in the first embossment 42 and slot 30 formed in cover plate 16 begins travelling down the first plurality of fluid flow passages 24(1). When the fluid reaches the bypass channel 68"", some of the fluid can "short circuit" the main flow path through the heat exchanger 10 and be diverted directly to the second plurality of fluid flow passages 24(2) proximal to the outlet end (i.e. first end 34) of the heat exchanger 10 rather than travelling the entire length of the first plurality of fluid flow passages 24(1). Therefore, only some of the incoming heat exchange fluid will travel the entire length of the first plurality of fluid flow passages 24(1) to turnaround areas 26 before travelling back along the heat exchanger 10 through the second plurality of fluid flow passages 24(2). By providing a bypass channel 68"" directly in the structure of the base plate 14 forming the flow channels 24(1), 24(2), undue pressure drop can be avoided since incoming fluid can be diverted directly to the outlet prior to completing a full pass through the heat exchanger 10.

In the embodiment of FIG. 13 the integrated bypass feature of base plate 14' comprises a continuous bypass channel 68"" formed by providing gaps in all the ribs 28 of base plate 14', with the gaps being transversely aligned with one another across the width of the base plate 14'. However, it will be appreciated that it is not essential that the integrated bypass feature has this exact configuration. For example, in other embodiments, the integrated bypass feature may comprise providing gaps in only some of the ribs 28. For instance, in other embodiments, the gaps may be formed in some or all of the first ribs 28(1) and/or some or all of the second ribs 28(2), and the gaps may be staggered relative to one another, such that they are not transversely aligned along the width of the base plate 14'.

Figure 14:
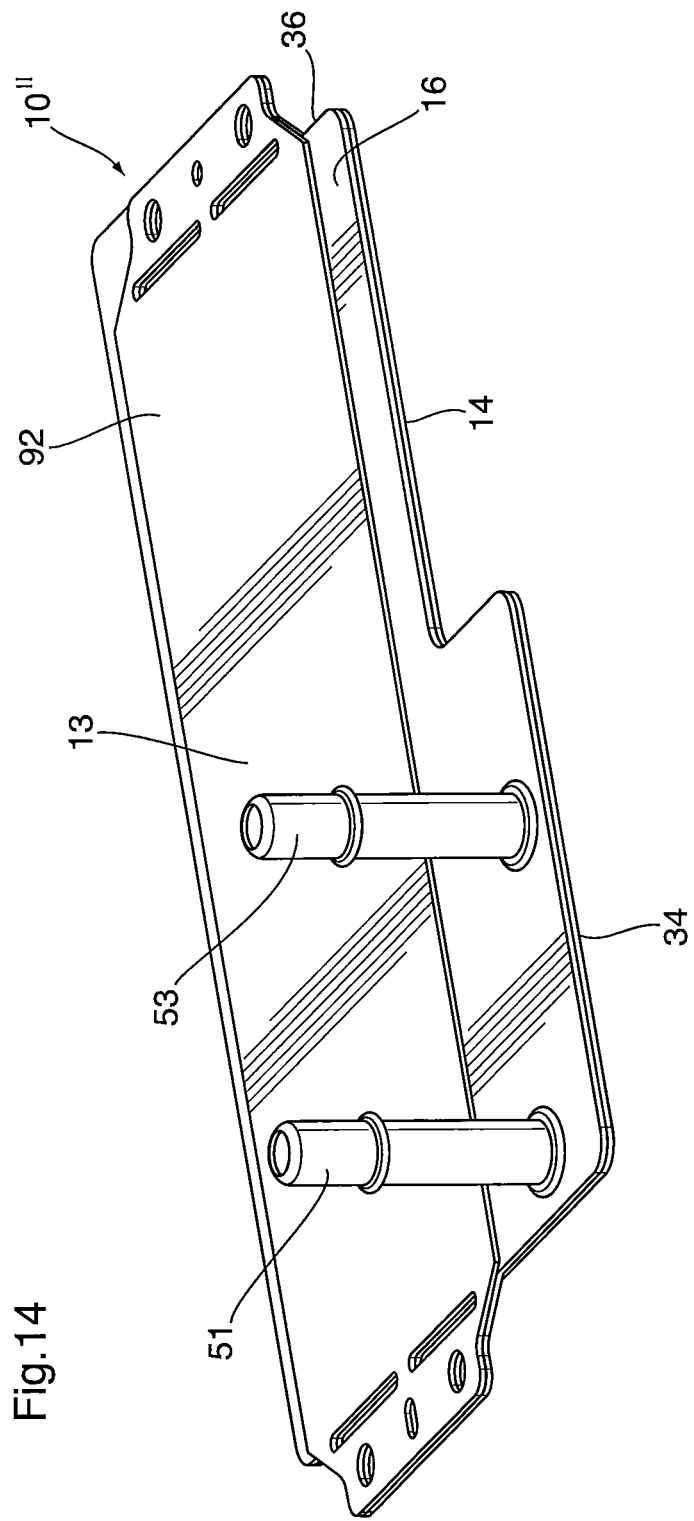
FIG. 14 is a perspective view of a U-flow heat exchanger according to another embodiment.
Figure 15:
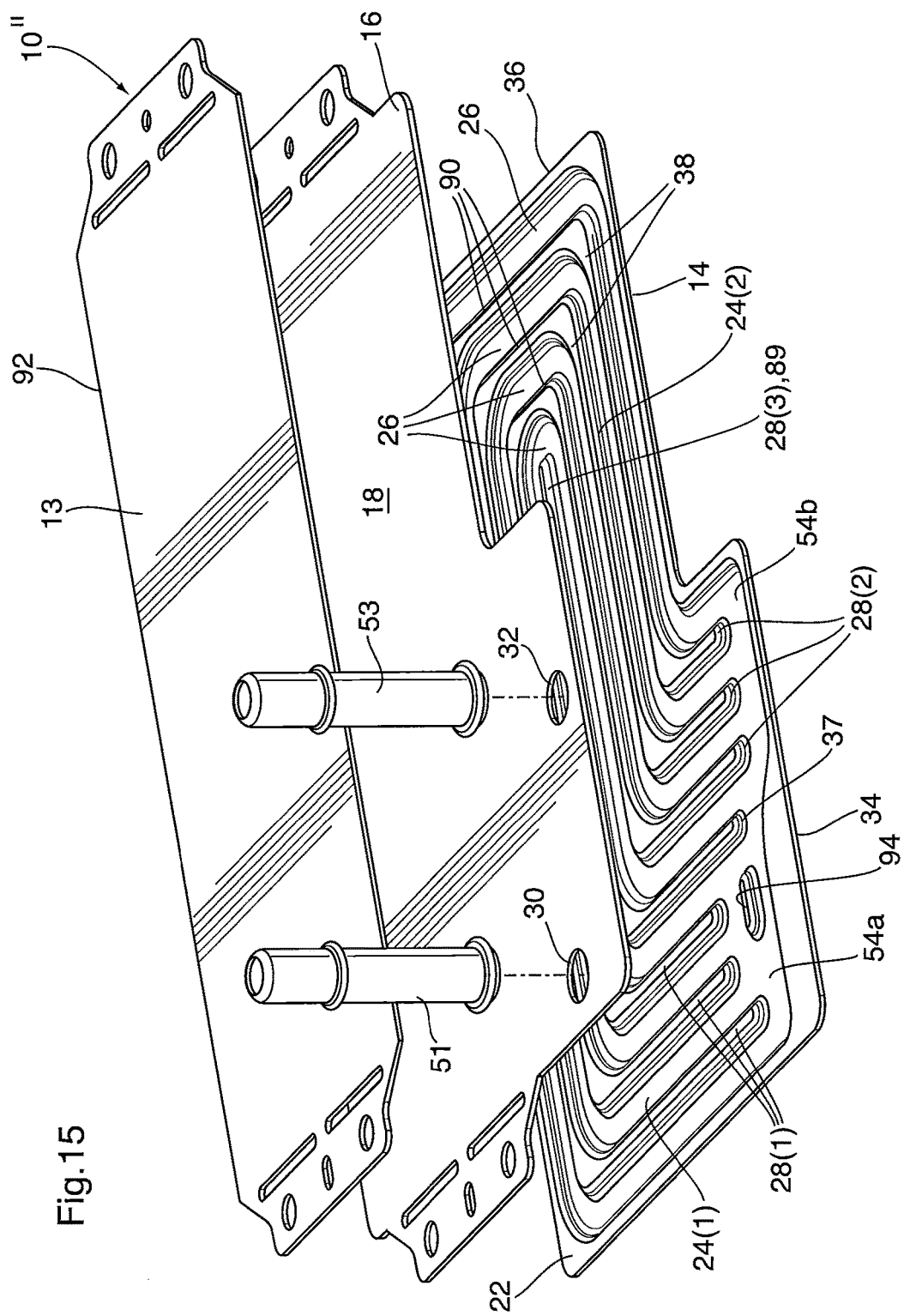
FIG. 15 is an exploded perspective view of the heat exchanger of FIG. 14.
Figure 16:
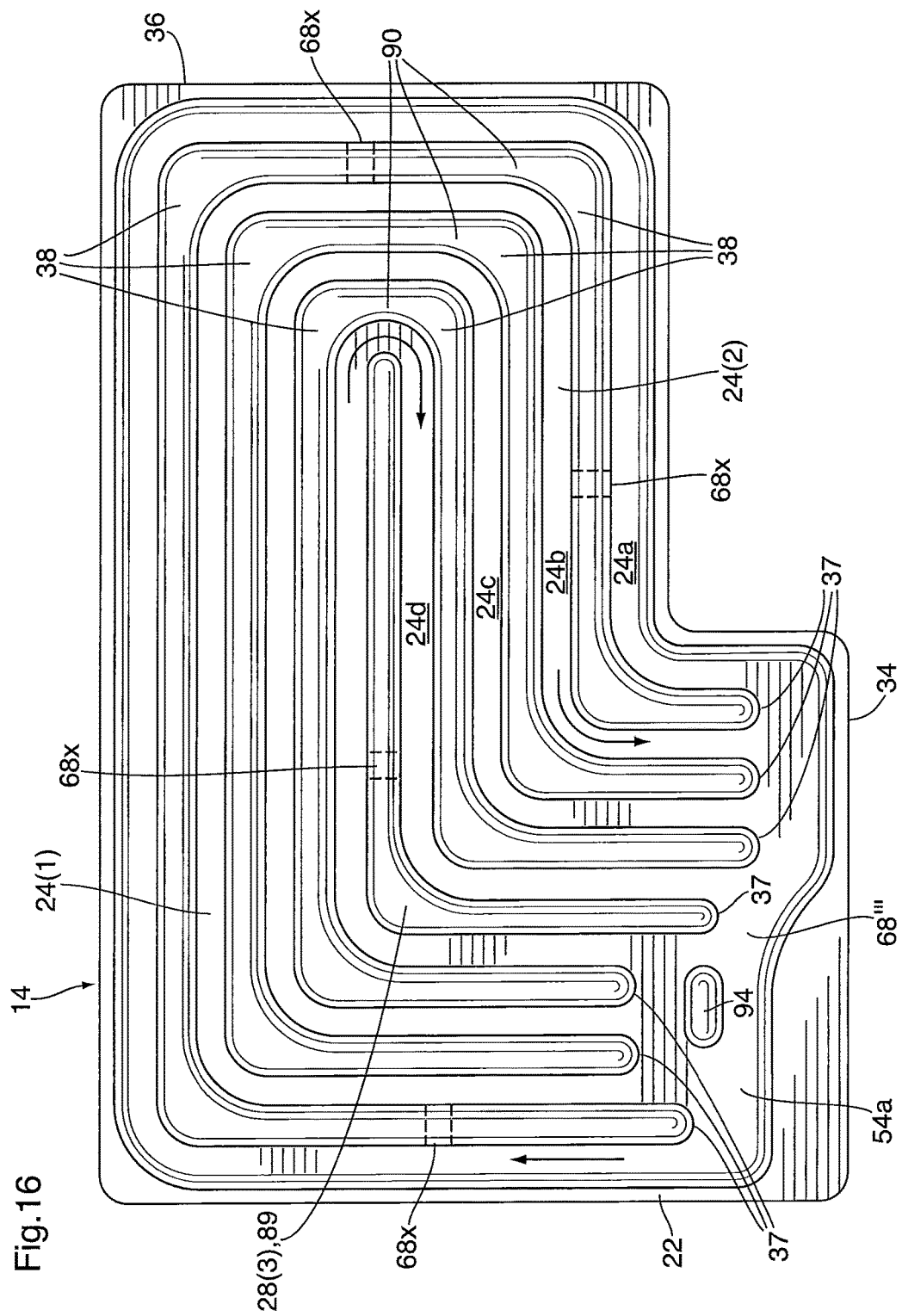
FIG. 16 is a top plan view of the bottom plate of the U-flow heat exchanger of FIG. 14.

FIGS. 14-16 show a modified U-flow heat exchanger 10" incorporating an integrated bypass feature in the base plate 14 thereof, consistent with the schematic illustration of FIG. 12. In FIGS. 14-16 and the following description, like elements of heat exchanger 10" are identified by like reference numerals, and the above descriptions of these like elements in connection with heat exchangers 10, 10' applies to the present embodiment.

Heat exchanger 10" comprises a base plate 14 configured for U-flow, but differs from the base plate 14 of heat exchanger 10' in that it is generally L-shaped, due to application requirements. Accordingly, the base plate 14 of heat exchanger 10" includes an L-shaped peripheral flange 22, L shaped ribs 28, and an L-shaped flow barrier 89 or dividing rib 28(3) separating the base plate into a first flow passage portion 24(1) and a second flow passage portion 24(2), both of which are L-shaped. The first end 34 of base plate 14 in FIGS. 14-16 is the end of base plate 14 at which the inlet and outlet are located, while the second end 36 of base plate 14 is angled at 90 degrees relative to the first end 34, being located at the right end of base plate 14.

The L-shaped first and second flow passage portions 24(1), 24(2) respectively include a plurality of first ribs 28 and a plurality of second ribs 28(2), each of the ribs 28 having a first end 37 spaced from the peripheral flange 22 at the first end 34 of base plate 14, and a second end 38 spaced from the peripheral flange 22 at the second end 36 of the base plate 14.

The base plate 14 of heat exchanger 10" also differs from that of heat exchanger 10' in that it lacks a continuous U-shaped turn portion 26 at the second end 36. Rather, the second ends 38 of ribs 28 are joined together by transverse rib portions 90 so as to define a series of nested, U-shaped or L-shaped fluid flow passages 24a, 24b, 24c, 24d, each extending through the first and second flow passage portions 24(1), 24(2). Each of the fluid flow passages 24a, 24b, 24c, 24d includes a turnaround area 26 in which the fluid flow changes direction between the first and second flow passage portions 24(1), 24(2).

Heat exchanger 10" also includes a cover plate 16 having an L-shape corresponding to that of the base plate 14. Rather than having one or more first and second fluid openings 30, 32 defined by a slot or a plurality of spaced openings, the cover plate 16 of heat exchanger 10" includes a single first opening 30 and a single second opening 32, both of which are formed as circular holes.

Heat exchanger 10" also differs from heat exchangers 10, 10' described above in that it lacks a manifold cover 40. Instead, tubular fittings 51, 53 are directly secured to the first and second openings 30, 32 in the cover plate 16. Inlet and outlet manifold spaces for fluid distribution are provided by inlet and outlet manifold spaces 54a, 54b at the first end of base plate 14, i.e. between the first ends 37 of ribs 28 and the peripheral flange 22 at the first end 34. It will be appreciated, however, that heat exchanger 10" may be provided with a manifold cover 40 without an integrated bypass, as described above with reference to FIGS. 1-4, for example to provide greater flexibility as to the locations of openings 50, 52 and fittings 51, 53. Alternatively, as discussed above, the cover plate 16 may be provided with embossments surrounding each of the openings 30, 32.

Heat exchanger 10" also includes a second cover plate 92 provided over the central, generally planar region 18 of cover plate 16 defining the primary heat transfer surface 13.

The integrated bypass feature of heat exchanger 10" is provided in the base plate 14, in the same manner as described above with reference to FIG. 12. In this regard, a bypass channel 68''' is formed in flow barrier 89 so as to establish fluid communication between the first flow passage portion 24(1) and the second flow passage portion 24(2) at a location farther upstream (i.e. closer to first end 34 of base plate 14) than the U-turn portions 26. Accordingly, fluid travelling through the inlet manifold space 54a of the incoming first flow passage portion 24(1) can be diverted directly to the outlet manifold space 54b of the outgoing second flow passage portion 24(2) by way of the bypass channel 68''' without having to complete the full pass through the heat exchanger 10. In the present embodiment, the bypass channel 68''' is located at the first end 34 of base plate, between the peripheral flange 22 and the first end 37 of the dividing rib 28(3) defining the flow barrier 89.

In addition or instead of providing bypass channel 68''' at the first end 37 of dividing rib 28(3), one or more of the other ribs 28(1), 28(2) and/or one or more of the transverse rib portions 90 defining flow passages 24a, 24b, 24c, 24d may be interrupted at any point along their length so as to provide additional bypass channels 68. The possible locations of these additional bypass channels are indicated by reference character 68x in FIG. 16.

Another feature of base plate 14 of heat exchanger 10" is the provision of a bypass rib portion 94 located in the bypass channel 68''' so as to adjust and guide the bypass flow of cooling fluid between the openings 30, 32, and/or to provide structural support within the inlet manifold space 54a.

Therefore, while various embodiments of battery cooling heat exchangers having integrated bypass features have been described, it will be understood that certain adaptations and modifications of the described embodiments can be made.

Therefore, the above discussed embodiments are considered to be illustrative and not restrictive.

What is claimed is:

1. A heat exchanger for battery thermal management applications, comprising:
a heat exchanger core defining at least one internal, two-pass flow passage, the at least one internal, two-pass flow passage having an inlet end, an outlet end, at least a first flow passage portion and at least a second flow passage portion, the first and second flow passage portions being interconnected by a generally U-shaped turn portion;
an inlet manifold in fluid communication with said inlet end of said internal flow passage for delivering an incoming fluid stream to said heat exchanger;
an outlet manifold in fluid communication with said outlet end of said internal flow passage for discharging an outgoing fluid stream from said heat exchanger; and
at least one bypass passage fluidly interconnecting said incoming fluid stream and said outgoing fluid stream, said at least one bypass passage allowing fluid from the incoming fluid stream to be diverted to said outlet manifold, at least partially bypassing said at least one internal, two-pass flow passage of said heat exchanger.

2. The heat exchanger as claimed in claim 1, wherein said heat exchanger core comprises:
a base plate having a central, generally planar portion surrounded by a peripheral flange, said at least one internal, two-pass flow passage being formed within the central generally planar portion of said base plate;
a cover plate arranged over top of and in sealing engagement with said base plate enclosing said at least one internal, two-pass flow passage, said cover plate having a central, generally planar portion that defines primary heat transfer surface of said heat exchanger;
wherein the cover plate comprises at least one inlet opening in fluid communication with the inlet manifold and with the inlet end of the at least one internal flow passage; and at least one outlet opening in fluid communication with the outlet manifold and with the outlet end of the at least one internal flow passage.

3. The heat exchanger as claimed in claim 2, further comprising a manifold cover arranged on top of and in sealing engagement with said cover plate and at least partly defining said inlet and outlet manifolds;
wherein said at least one bypass passage interconnects said inlet manifold and said outlet manifold, the at least one bypass passage being provided in the manifold cover.

4. The heat exchanger as claimed in claim 3, wherein said manifold cover comprises:
an inlet manifold flow channel in fluid communication with the at least one inlet opening of the cover plate for delivering an incoming heat exchange fluid to the inlet end of said at least one internal flow passage;
an outlet manifold flow channel in fluid communication with the at least one outlet opening of the cover plate for receiving said heat exchange fluid from the outlet end of said at least one internal flow passage;
a flow barrier arranged intermediate said inlet and outlet manifold flow channels, wherein each said bypass passage is defined by a gap in the flow barrier.

5. The heat exchanger as claimed in claim 4, wherein said manifold cover further comprises:
a raised, central portion surrounded by a peripheral flange for sealing against said cover plate, said peripheral flange having a bottom planar sealing surface which is sealingly joined to an area of the cover plate surrounding the at least one inlet opening and the at least one outlet opening;
said flow barrier formed within said raised, central portion of said manifold cover and extending along a longitudinal axis thereof, the flow barrier having a bottom surface sealingly joined to an area of the cover plate extending along a line between the at least one inlet opening and the at least one outlet opening.

6. The heat exchanger as claimed in claim 5, wherein said flow barrier comprises at least a first flow barrier segment and a second flow barrier segment, wherein the first and second flow barrier segments are spaced apart from each other by one said gap defining one said bypass passage fluidly interconnecting said inlet manifold flow channel and said outlet manifold flow channel.

7. The heat exchanger as claimed in claim 5, wherein said first flow barrier segment has a first end spaced apart from a corresponding end of said raised, central portion; and/or
said second flow barrier segment has a first end spaced apart from a corresponding end of said raised, central portion.

8. The heat exchanger as claimed in claim 5, further comprising:
a fluid inlet opening formed in said raised, central portion of said manifold cover in fluid communication with said inlet manifold flow channel; and
a fluid outlet opening formed in said raised, central portion of said manifold cover in fluid communication with said outlet manifold flow channel.

9. The heat exchanger as claimed in claim 8, wherein said fluid inlet opening and said fluid outlet opening are positionable at any location along a length of said inlet and outlet manifold flow channels, respectively.

10. The heat exchanger as claimed in claim 1, wherein said at least one internal, two-pass flow passage is comprised of a series of alternating first flow channels and second flow channels, each of said first flow channels being interconnected to an adjacent second flow channel by a generally U-shaped turn portion;
said first flow channels each having a first end in fluid communication with said inlet manifold, the series of first ends of the first flow channels defining said inlet end; and
said second flow channels each having a second end in fluid communication with said outlet manifold, the series of second ends of said second flow channels defining said outlet end.

11. The heat exchanger as claimed in claim 3, wherein said manifold cover comprises:
an inlet manifold flow channel in fluid communication with the at least one inlet opening of the cover plate for delivering an incoming heat exchange fluid to the inlet end of said at least one internal flow passage;
an outlet manifold flow channel in fluid communication with the at least one outlet opening of the cover plate for receiving said heat exchange fluid from the outlet end of said at least one internal flow passage;
a valve component mounted on said manifold cover in sealing engagement therewith, said valve component comprising:
a valve chamber;
a first inlet in fluid communication with said inlet manifold flow channel and said valve chamber;
a second inlet in fluid communication with said second manifold flow channel and said valve chamber;

an outlet in fluid communication with said valve chamber;

a valve mechanism arranged within said valve chamber for controlling flow between said first inlet and said outlet, the valve mechanism having a first operational state permitting fluid flow from said first inlet to said outlet and a second operational state prevent fluid flow from said first inlet to said outlet; and wherein said bypass passage is in the form of a fluid opening formed in said inlet manifold flow channel establishing fluid communication between said inlet manifold flow channel and said second manifold flow channel via said valve component.

12. The heat exchanger as claimed in claim 11, wherein said valve mechanism is selected from one of the following alternatives: a thermal wax motor or a solenoid activated valve.

13. The heat exchanger as claimed in claim 11, wherein said manifold cover further comprises:

a pair of generally parallel embossments formed in the manifold cover, said embossments defining said inlet and outlet manifold flow channels;

a peripheral flange surrounding said pair of generally parallel embossments, said peripheral flange having a bottom planar sealing surface which is sealingly joined to an area of the cover plate surrounding the at least one inlet opening and the at least one outlet opening; and wherein said embossments are separated and spaced apart from each other by an intermediate portion lying in the same plane as said peripheral flange, the intermediate portion having a bottom surface sealingly joined to an area of the cover plate extending along a line between the at least one inlet opening and the at least one outlet opening.

14. The heat exchanger as claimed in claim 1, wherein said bypass passage fluidly interconnects said first flow passage portion and said second flow passage portion at a location upstream from said U-shaped turn portion.

15. The heat exchanger as claimed in claim 1, wherein said heat exchanger core comprises:

a base plate having a central, generally planar portion surrounded by a peripheral flange, said at least one internal, two-pass flow passage being formed within the central generally planar portion of said base plate;

a cover plate arranged over top of and in sealing engagement with said base plate enclosing said at least one internal, two-pass flow passage, said cover plate having a central, generally planar portion that defines primary heat transfer surface of said heat exchanger;

wherein said at least one internal, two-pass flow passage is comprised of a series of alternating first flow channels and second flow channels, each of said first flow channels being fluidly interconnected to at least one second flow channel by a generally U-shaped turn portion, the first and second flow channels each defining a flow direction through said heat exchanger;

said first flow channels each having a first end in fluid communication with said inlet manifold, the series of first ends of the first flow channels defining said inlet end; and said second flow channels each having a second end in fluid communication with said outlet manifold, the series of second ends of said second flow channels defining said outlet end;

wherein said at least one bypass passage is formed in said base plate and fluidly interconnects at least one of said first flow channels and at least one of said second flow channels at a location upstream of the generally U-shaped turn portion.

16. The heat exchanger as claimed in claim 15, wherein said at least one bypass passage is formed in said base plate and fluidly interconnects at least one of said first flow channels and at least one of said second flow channels at a location proximal to said outlet end of the at least one two-pass flow passage.

17. The heat exchanger as claimed in claim 15, wherein the base plate is configured for counter-flow of a fluid through said at least one two-pass flow passage;

wherein said at least one two-pass flow passage comprises a series of alternating first flow channels and second flow channels, each of said first flow channels being fluidly interconnected to an adjacent second flow channel by one said generally U-shaped turn portion;

wherein said first and second flow channels are defined by a plurality of ribs;

wherein each of said at least one bypass passage is defined by a gap in one of said ribs, said gap fluidly interconnecting one of said first flow channels to one of said second flow channels;

wherein said at least one bypass passage comprises a bypass passage extending in a transverse direction relative to the flow direction of said series of alternating first and second flow channels and defined by a series of gaps provided in said plurality of ribs, the gaps being aligned in said transverse direction.

18. The heat exchanger as claimed in claim 15, wherein the base plate is configured for U-flow of a fluid through said at least one two-pass flow passage;

wherein said at least one two-pass flow passage comprises a generally U-shaped flow passage having a first flow passage portion, a second flow passage portion and a flow barrier between the first and second flow passage portions;

wherein the inlet end and the outlet end of the internal, two-pass flow passage are both located at a first end of the base plate, and the at least one generally U-shaped turn portion is located proximate to a second end of the base plate;

wherein an inlet manifold portion and an outlet manifold portion are defined at the first end of the base plate, on opposite sides of said flow barrier;

wherein the flow barrier comprises a rib which is provided with at least one gap proximate to the first end of the base plate, said at least one gap defining said at least one bypass passage;

wherein said at least one bypass passage fluidly interconnects the inlet and outlet manifold portions of the base plate.

19. The heat exchanger as claimed in claim 18, wherein said at least one two-pass flow passage comprises a plurality of nested, generally U-shaped flow passages defined by a plurality of ribs.

20. The heat exchanger as claimed in claim 18, wherein a bypass rib portion is provided in the at least one bypass passage fluidly interconnecting the inlet and outlet manifold portions of the base plate.

* * * * *